US012795598B2

(12) United States Patent
Hwang et al.

(10) Patent No.: US 12,795,598 B2
(45) Date of Patent: Nov. 10, 2026

(54) METHOD BY WHICH FIRST TERMINAL MEASURES POSITION ON BASIS OF SOUND WAVE SIGNALS IN WIRELESS COMMUNICATION SYSTEM, AND APPARATUS THEREFOR

(71) Applicant: LG Electronics Inc., Seoul (KR)

(72) Inventors: Jaeho Hwang, Seoul (KR); Hakseong Kim, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 107 days.

(21) Appl. No.: 18/702,651

(22) PCT Filed: Oct. 18, 2022

(86) PCT No.: PCT/KR2022/015863
§ 371 (c)(1),
(2) Date: Apr. 18, 2024

(87) PCT Pub. No.: WO2023/068757
PCT Pub. Date: Apr. 27, 2023

(65) Prior Publication Data

US 2025/0287348 A1 Sep. 11, 2025

(30) Foreign Application Priority Data

Oct. 18, 2021 (KR) ........................ 10-2021-0138590

(51) Int. Cl.
*H04W 64/00* (2009.01)
*G01S 5/26* (2006.01)

(52) U.S. Cl.
CPC ............. *H04W 64/006* (2013.01); *G01S 5/26* (2013.01)

(58) Field of Classification Search
None
See application file for complete search history.

(56) References Cited

U.S. PATENT DOCUMENTS

2005/0046584 A1* 3/2005 Breed ................ B60N 2/02246 340/13.31
2018/0356520 A1* 12/2018 Booij ..................... H04B 11/00
(Continued)

FOREIGN PATENT DOCUMENTS

CN 102685915 A * 9/2012
CN 104459626 A 3/2015
(Continued)

OTHER PUBLICATIONS

International Search Report and Written Opinion in International Appln. No. PCT/KR2022/015863, mailed on Feb. 8, 2023, 15 pages (with English translation).
(Continued)

*Primary Examiner* — Jonathan D Armstrong
(74) *Attorney, Agent, or Firm* — Fish & Richardson P.C.

(57) ABSTRACT

According to various embodiments, disclosed are a method by which a first terminal measures a position in a wireless communication system, and an apparatus therefor. Disclosed are a method and an apparatus therefor, the method comprising the steps of: reporting capability information related to the first terminal; reporting state information related to the first terminal; receiving first configuration information related to positioning; receiving sound wave signals from two or more devices on the basis of the first configuration information; calculating a reception time difference between the sound wave signals; and measuring the position of the first terminal on the basis of the reception time difference.

5 Claims, 23 Drawing Sheets

(56) References Cited

U.S. PATENT DOCUMENTS

| | | | | |
|---|---|---|---|---|
| 2019/0113966 | A1* | 4/2019 | Connellan | G01C 21/1656 |
| 2019/0116556 | A1* | 4/2019 | Golsch | H04W 52/0245 |
| 2019/0274130 | A1* | 9/2019 | Cheng | H04W 72/12 |
| 2020/0119780 | A1* | 4/2020 | Klemmer | H01Q 3/24 |

FOREIGN PATENT DOCUMENTS

| | | | |
|---|---|---|---|
| KR | 10-2011-0086210 | A | 7/2011 |
| KR | 10-2017-0021022 | A | 2/2017 |
| KR | 10-2021-0047241 | A | 4/2021 |
| WO | WO 2021/182837 | A1 | 9/2021 |
| WO | WO 2021/187967 | A1 | 9/2021 |

OTHER PUBLICATIONS

Extended European Search Report in European Appln. No. 22883980.9, mailed on Oct. 17, 2025, 12 pages.

* cited by examiner (a)

(b)

(a)

(b)

(c)

(a)

(b)

METHOD BY WHICH FIRST TERMINAL MEASURES POSITION ON BASIS OF SOUND WAVE SIGNALS IN WIRELESS COMMUNICATION SYSTEM, AND APPARATUS THEREFOR

CROSS-REFERENCE TO RELATED APPLICATIONS

This application is a National Stage application under 35 U.S.C. § 371 of International Application No. PCT/KR2022/015863, filed on Oct. 18, 2022, which claims the benefit of Korean Application No. 10-2021-0138590, filed on Oct. 18, 2021. The disclosures of the prior applications are incorporated by reference in their entirety.

TECHNICAL FIELD

The present disclosure relates to a method of measuring a position by a first user equipment (UE) based on sound wave signals in a wireless communication system, and an apparatus therefor.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

SUMMARY

The present disclosure provides a method and apparatus for providing a position measurement service based on sound wave signals in a specific area in which degradation of position measurement occurs using a global positioning system (GPS) or a global navigation satellite system (GNSS)

to guarantee accuracy and reliability of position measurement of a UE even in the specific area.

It will be appreciated by persons skilled in the art that the objects that could be achieved with the various embodiments of the present disclosure are not limited to what has been particularly described hereinabove and the above and other objects that the various embodiments of the present disclosure could achieve will be more clearly understood from the following detailed description.

According to an aspect of the present disclosure, provided herein is a method of measuring a position by a first user equipment (UE) in a wireless communication system, including reporting capability information related to the first UE, reporting state information related to the first UE, receiving first setting information related to position measurement, receiving sound wave signals from two or more devices based on the first setting information, calculating a time difference of arrival between the sound wave signals, and measuring a position of the first UE based on the time difference of arrival. The capability information may include information about performance of a microphone included in the first UE, and the first setting information may include information about a frequency band of the sound wave signals and a sound wave multiplexing type, determined based on at least one of the capability information or the state information.

The state information may include a movement speed of the UE and noise information measured based on the microphone.

The setting information may include information about one sound wave multiplexing type, determined based on the noise information and the movement speed included in the state information, among a plurality of multiplexing types, and the multiplexing types include a time-division multiplexing (TDM) type, a frequency-division multiplexing (FDM) type, and a code-division multiplexing (CDM) type.

The setting information may not include information about a multiplexing type of the FDM type, based on the state information including the noise information having noise intensity equal to or greater than a first threshold value.

The setting information may include information about a multiplexing type determined as the CDM type, based on the state information including the noise information having noise intensity equal to or greater than a first threshold value and including the movement speed equal to or greater than a first threshold speed.

A multiplexing type of the sound wave signals may be determined as the FDM type or the CDM type, based on the state information including the movement speed equal to or greater than a first threshold speed.

The capability information may further include information about performance of a processor of the first UE. A multiplexing type of the sound wave signals may be determined as the CDM type, based on the setting information including the performance of the processor of the first UE equal to or greater than a first threshold performance.

The method may further include receiving second setting information including information about service zones related to position measurement based on the sound wave signals and including position information of the two or more devices in each service zone. The state information may be reported based on the first UE entering one of the service zones.

In another aspect of the present disclosure, provided herein is a method of supporting position measurement performed by a first user equipment (UE) by a first device in a wireless communication system, including receiving capability information related to the first UE, receiving state information from the first UE, transmitting first setting information related to the position measurement to the first UE, and transmitting a sound wave signal based on the first setting information. The capability information may include information about performance of a microphone included in the first UE. The setting information may include information about a frequency band of the sound wave signal and a sound wave multiplexing type, determined based on at least one of the capability information or the state information.

In another aspect of the present disclosure, provided herein is a first user equipment (UE) for measuring a position in a wireless communication system, including a radio frequency (RF) transceiver, and a processor connected to the RF transceiver. The processor controls the RF transceiver to report capability information related to the first UE, report state information related to the first UE, receive first setting information related to position measurement, and receive sound wave signals from two or more devices based on the first setting information, calculates a time difference of arrival between the sound wave signals, and measures a position of the first UE based on the time difference of arrival. The capability information may include information about performance of a microphone included in the first UE. The first setting information may include information about a frequency band of the sound wave signals and a sound wave multiplexing type, determined based on at least one of the capability information or the state information.

The state information may include a movement speed of the UE and noise information measured based on the microphone.

In another aspect of the present disclosure, provided herein is a first device for supporting position measurement performed by a first user equipment (UE) in a wireless communication system, including a radio frequency (RF) transceiver, and a processor connected to the RF transceiver. The processor controls the RF transceiver to receive capability information related to the first UE, receive state information from the first UE, transmit first setting information related to the position measurement to the first UE, and transmit a sound wave signal based on the first setting information. The capability information may include information about performance of a microphone included in the first UE. The setting information may include information about a frequency band of the sound wave signal and a sound wave multiplexing type, determined based on at least one of the capability information or the state information.

In another aspect of the present disclosure, provided herein is a chipset for measuring a position of a first user equipment (UE) in a wireless communication system, including at least one processor, and at least one memory operably connected to the at least one processor and storing instructions that, when executed, cause the at least one processor to perform operations. The operations include reporting capability information related to the first UE, reporting state information related to the first UE, receiving first setting information related to position measurement, receiving sound wave signals from two or more devices based on the first setting information, calculating a time difference of arrival between the sound wave signals, and measuring a position of the first UE based on the time difference of arrival. The capability information may include information about performance of a microphone included in the first UE. The first setting information may include information about a frequency band of the sound wave signals and a sound wave multiplexing type, determined based on at least one of the capability information or the state information.

In another aspect of the present disclosure, provided herein is a computer-readable storage medium storing at least one computer program for performing operations of measuring a position of a first user equipment (UE) in a wireless communication system. The operations include reporting capability information related to the first UE, reporting state information related to the first UE, receiving first setting information related to position measurement, receiving sound wave signals from two or more devices based on the first setting information, calculating a time difference of arrival between the sound wave signals, and measuring a position of the first UE based on the time difference of arrival. The capability information may include information about performance of a microphone included in the first UE. The first setting information may include information about a frequency band of the sound wave signals and a sound wave multiplexing type, determined based on at least one of the capability information or the state information.

Various embodiments provide a position measurement service based on sound wave signals in a specific area in which degradation of position measurement occurs using a GPS or a GNSS to guarantee accuracy and reliability of position measurement of a UE even in the specific area.

In addition, various embodiments provide robust sound wave signals in a sound wave channel environment of a UE by determining a frequency band and a multiplexing type of sound wave signals for a position measurement service based on the robust sound wave signals in consideration of a surrounding noise environment and a movement speed of the UE.

In addition, various embodiments provide a position measurement service based on sound wave signals even in the specific area to maximize an effect of providing a safety service with a nearby UE and/or a nearby vehicle.

Effects to be achieved by embodiment(s) are not limited to what has been particularly described hereinabove and other effects not mentioned herein will be more clearly understood by persons skilled in the art to which embodiment(s) pertain from the following detailed description.

BRIEF DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

DETAILED DESCRIPTION

Figure 1:
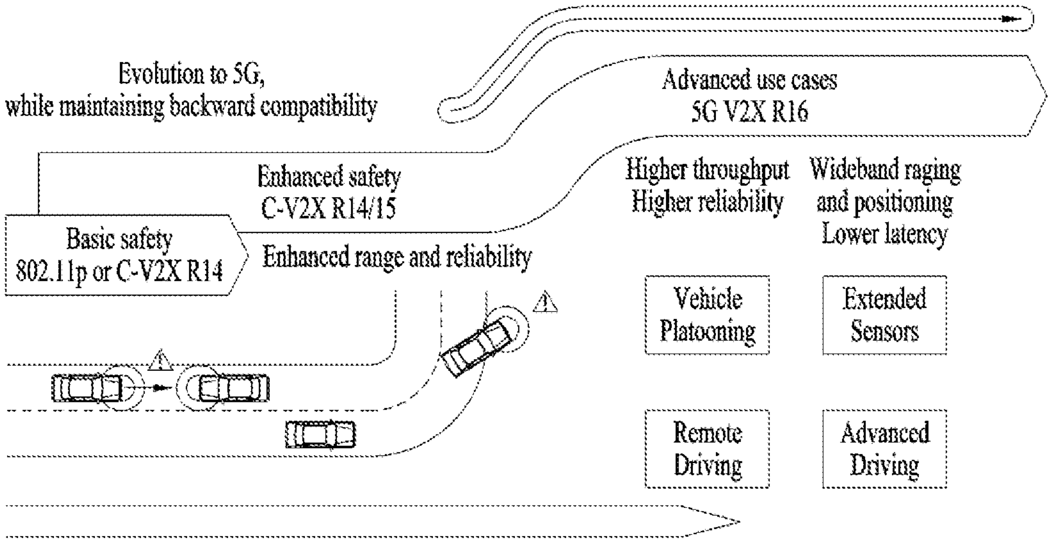
FIG. 1 is a diagram for explaining by comparing V2X communication based on RAT before NR and V2X communication based on NR.

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

Figure 2:
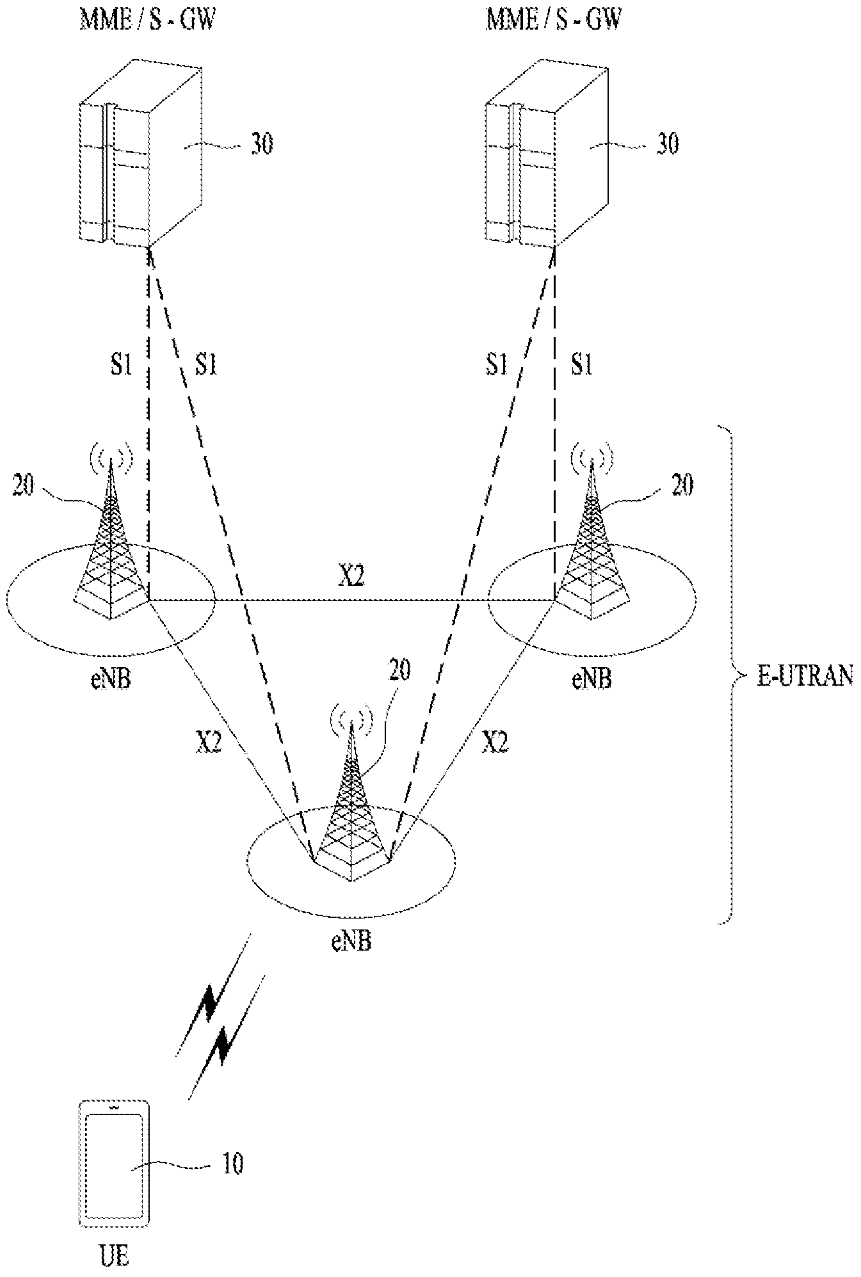
FIG. 2 illustrates the structure of an LTE system to which embodiment(s) are applicable.

For clarity of explanation, LTE-A or 5G NR is mainly described, but the technical spirit of the embodiment(s) is not limited thereto FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
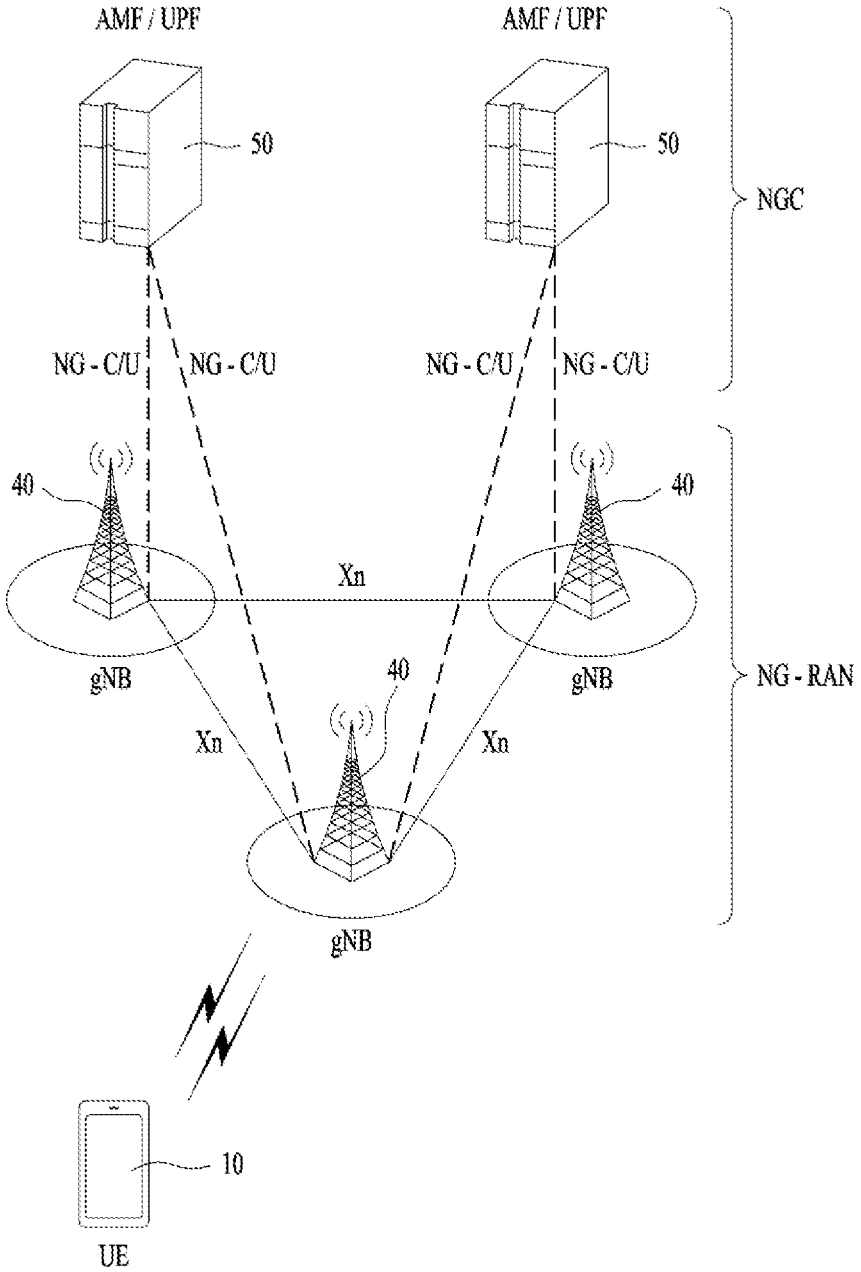
FIG. 3 illustrates the structure of an NR system to which embodiment(s) are applicable.

FIG. 3 illustrates the structure of a NR system to which the present disclosure is applicable.

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
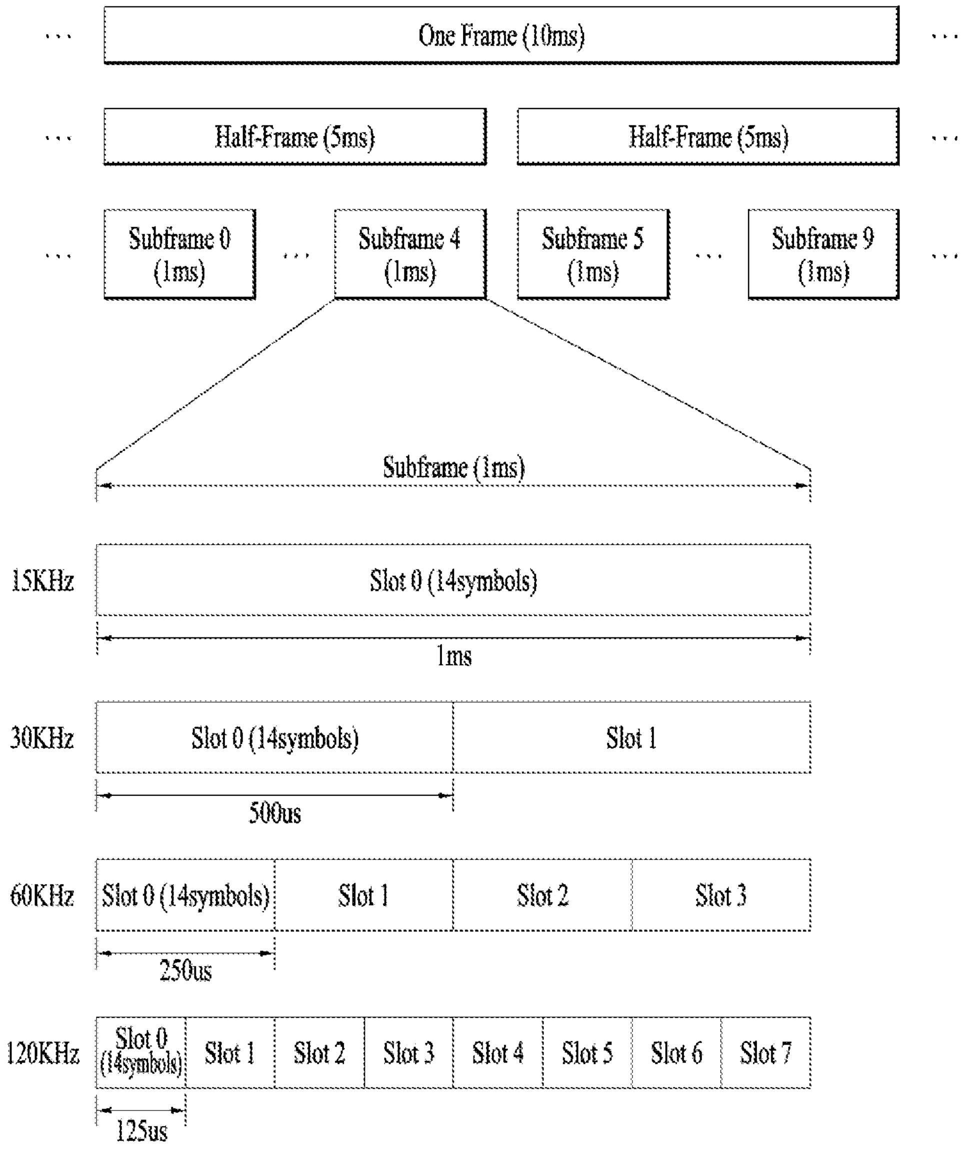
FIG. 4 illustrates the structure of an NR radio frame to which embodiment(s) are applicable.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM (A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration u in the NCP case.

TABLE 1

| SCS ($15*2^u$) | $N^{slot}_{symb}$ | $N^{frame,u}_{slot}$ | $N^{subframe,u}_{slot}$ |
|---|---|---|---|
| 15 kHz (u = 0) | 14 | 10 | 1 |
| 30 kHz (u = 1) | 14 | 20 | 2 |
| 60 kHz (u = 2) | 14 | 40 | 4 |
| 120 kHz (u = 3) | 14 | 80 | 8 |
| 240 kHz (u = 4) | 14 | 160 | 16 |

Table 2 below lists the number of symbols per slot, the number of slots per frame, and the number of slots per subframe according to an SCS in the ECP case.

TABLE 2

| SCS ($15*2^u$) | $N^{slot}_{symb}$ | $N^{frame,u}_{slot}$ | $N^{subframe,u}_{slot}$ |
|---|---|---|---|
| 60 kHz (u = 2) | 12 | 40 | 4 |

In the NR system, different OFDM (A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHZ, 5925 MHz, etc.) or higher. For example, the frequency band of 6 GHz (or 5850 MHz, 5900 MHZ, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
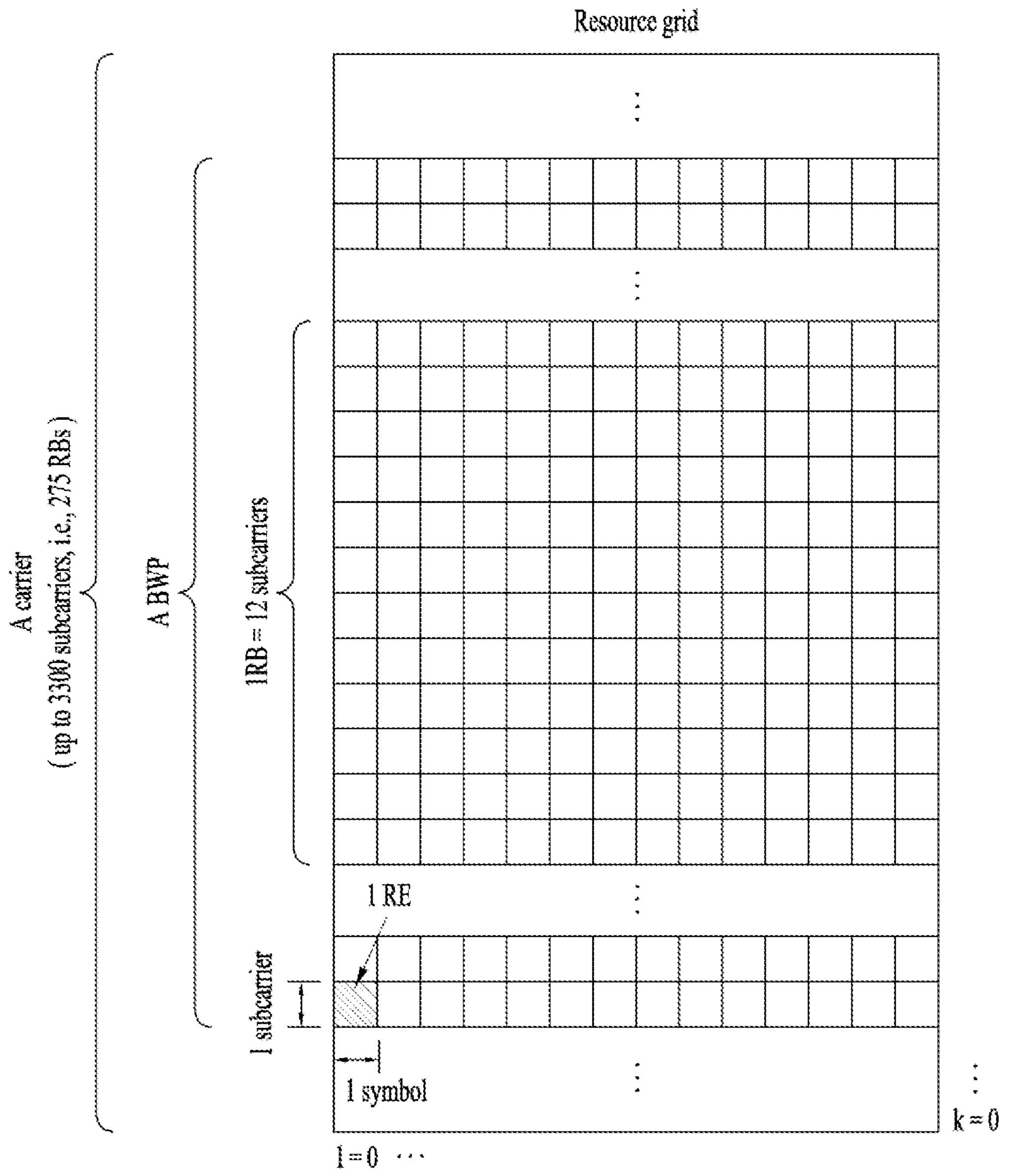
FIG. 5 illustrates the slot structure of an NR frame to which embodiment(s) are applicable.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 6:
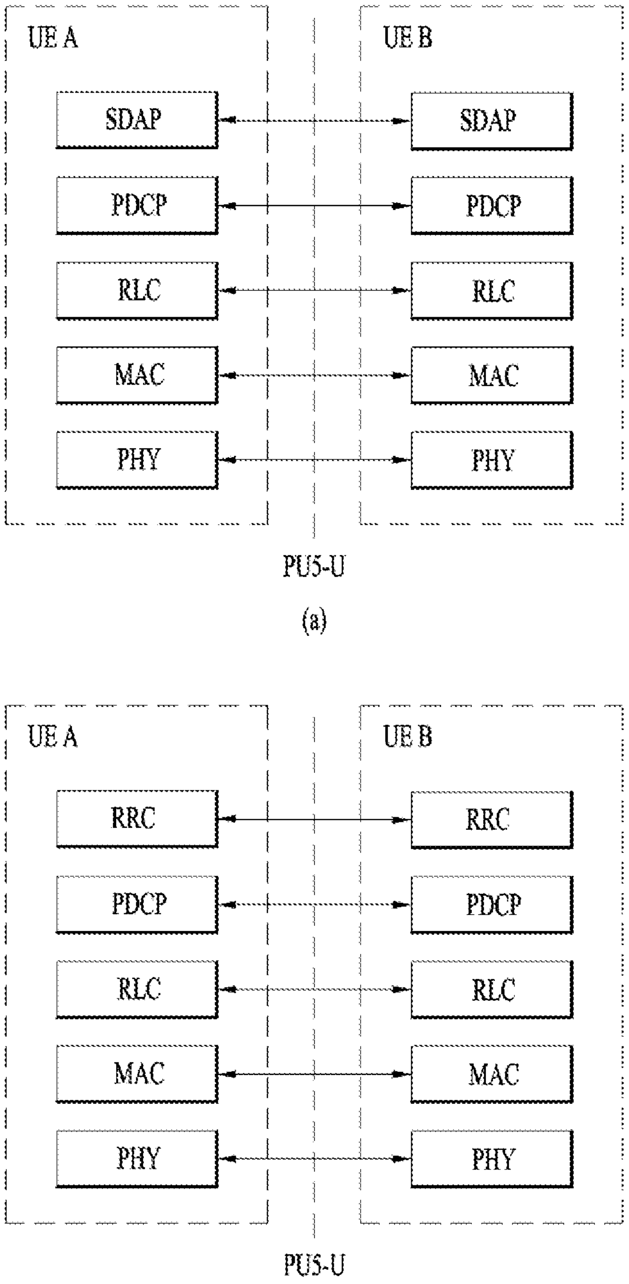
FIG. 6 illustrates a radio protocol architecture for SL communication.

FIG. 6 illustrates a radio protocol architecture for SL communication. Specifically, FIG. 6-(*a*) shows a user plane protocol stack of NR, and FIG. 6-(*b*) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre) set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be preconfigured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
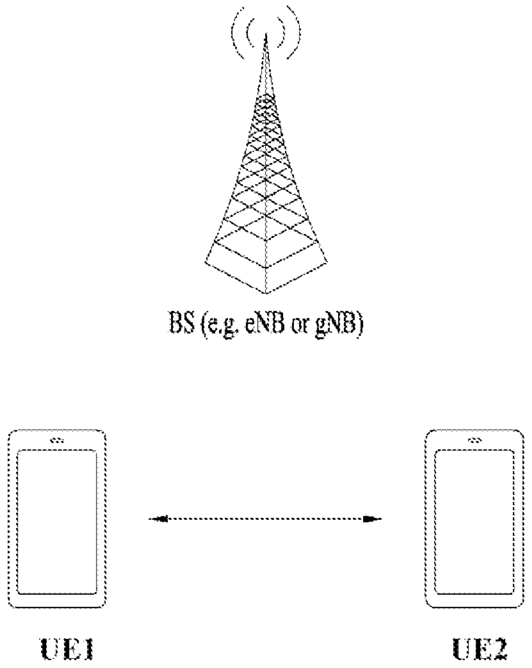
FIG. 7 illustrates UEs performing V2X or SL communication.

FIG. 7 illustrates UEs performing V2X or SL communication.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 8:
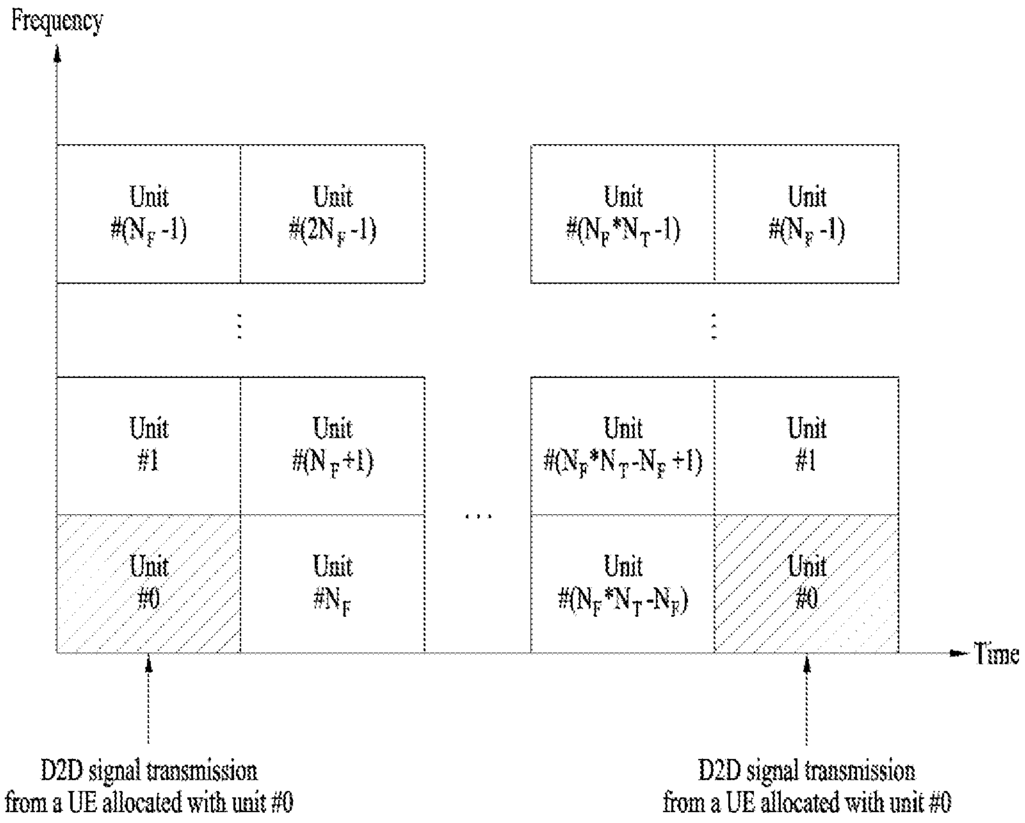
FIG. 8 illustrates resource units for V2X or SL communication.

FIG. 8 illustrates resource units for V2X or SL communication.

Referring to FIG. 8, the frequency resources of a resource pool may be divided into NF sets, and the time resources of the resource pool may be divided into NT sets. Accordingly, a total of NF*NT resource units may be defined in the resource pool. FIG. 8 shows an exemplary case where the resource pool is repeated with a periodicity of NT subframes.

As shown in FIG. 8, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Vehicular Communications for ITS

An intelligent transport system (ITS) utilizing vehicle-to-everything (V2X) may mainly include an access layer, a network & transport layer, a facilities layer, an application layer, security and management entities, etc. Vehicle communication may be applied to various scenarios such as vehicle-to-vehicle communication (V2V), vehicle-to-network communication (V2N or N2V), vehicle-to-road side unit (RSU) communication (V2I or I2V), RSU-to-RSU communication (I2I), vehicle-to-pedestrian communication (V2P or P2V), and RSU-to-pedestrian communication (I2P or P2I). A vehicle, a BS, an RSU, a pedestrian, etc. as the subjects of vehicle communication are referred to as ITS stations.

Figure 9:
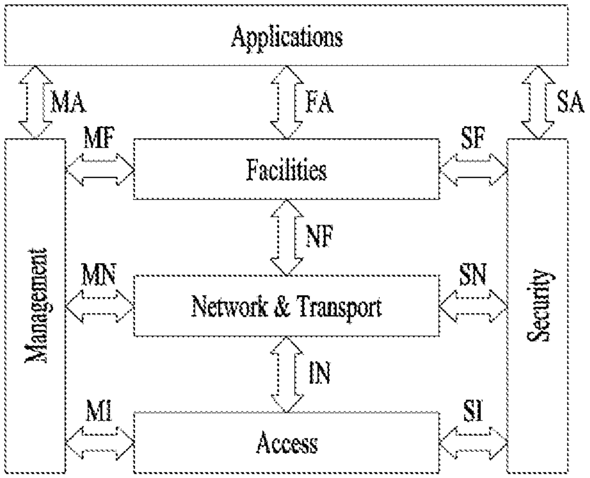
FIG. 9 is a diagram for explaining an ITS station reference architecture.

FIG. 9 is a diagram for explaining an ITS station reference architecture.

The ITS station reference architecture may include an access layer, a network & transport layer, a facilities layer, entities for security and management, and an application layer at the top. Basically, the ITS station reference architecture follows a layered OSI model.

Specifically, features of the ITS station reference architecture based on the OSI model are illustrated in FIG. 9. The access layer of the ITS station corresponds to OSI layer 1 (physical layer) and layer 2 (data link layer), the network & transport layer of the ITS station corresponds to OSI layer 3 (network layer) and layer 4 (transport layer), and the facilities layer of the ITS station corresponds to OSI layer 5 (session layer), layer 6 (presentation layer), and layer 7 (application layer).

The application layer, which is located at the highest layer of the ITS station, may actually implement and support a use-case and may be selectively used according to the use-case. The management entity serves to manage all layers in addition to managing communication and operations of the ITS station. The security entity provides security services for all layers. Each layer of the ITS station exchanges data transmitted or received through vehicle communication and additional information for various purposes through an interface. The abbreviations of various interfaces are described below.

Figure 10:
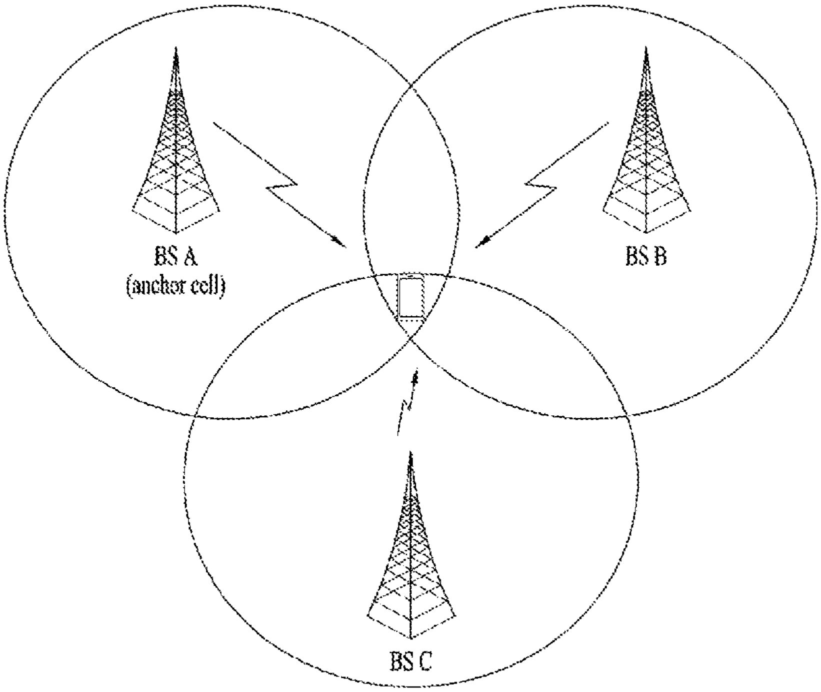
FIG. 10 is a diagram for explaining an observed time difference of arrival (OTDOA) positioning method to which the present disclosure is applicable.

- MA: Interface between management entity and application layer
- MF: Interface between management entity and facilities layer
- MN: Interface between management entity and networking & transport layer
- MI: Interface between management entity and access layer
- FA: Interface between facilities layer and ITS-S applications
- NF: Interface between networking & transport layer and facilities layer
- IN: Interface between access layer and networking & transport layer
- SA: Interface between security entity and ITS-S applications
- SF: Interface between security entity and facilities layer
- SN: Interface between security entity and networking & transport layer
- SI: Interface between security entity and access layer FIG. 10 is a diagram illustrating an OTDOA positioning method according to an embodiment of the present disclosure.

In the OTDOA positioning method, a UE utilizes measurement timings of DL signals received from multiple TPs including an eNB, an ng-eNB, and a PRS-dedicated TP. The UE measures the timings of the received DL signals using positioning assistance data received from a location server. The location of the UE may be determined based on the measurement results and the geographical coordinates of neighboring TPs.

A UE connected to a gNB may request a measurement gap for OTDOA measurement from a TP. When the UE fails to identify a single frequency network (SFN) for at least one TP in OTDOA assistance data, the UE may use an autonomous gap to acquire the SFN of an OTDOA reference cell before requesting a measurement gap in which a reference signal time difference (RSTD) is measured.

An RSTD may be defined based on a smallest relative time difference between the boundaries of two subframes received from a reference cell and a measurement cell. That is, the RSTD may be calculated as a relative timing difference between a time when the UE receives the start of a subframe from the reference cell and a time when the UE receives the start of a subframe from the measurement cell which is closest to the subframe received from the reference cell. The reference cell may be selected by the UE.

For accurate OTDOA measurement, it is necessary to measure the times of arrival (TOAs) of signals received from three or more geographically distributed TPs or BSs. For example, TOAs for TP 1, TP 2, and TP 3 may be measured, an RSTD for TP 1-TP 2, an RSTD for TP 2-TP 3, and an RSTD for TP 3-TP 1 may be calculated based on the three TOAs, geometric hyperbolas may be determined based on the calculated RSTDs, and a point where these hyperbolas intersect may be estimated as the location of the UE. Accuracy and/or uncertainty may be involved in each TOA measurement, and thus the estimated UE location may be known as a specific range according to the measurement uncertainty.

For example, an RSTD for two TPs may be calculated by Equation 1.

$$RSTDi,1=\frac{\sqrt{(x_t-x_i)^2+(y_t-y_i)^2}}{c}-\frac{\sqrt{(x_t-x_1)^2+(y_t-y_1)^2}}{c}+(T_i-T_1)+(n_i-n_1) \qquad \text{[Equation 1]}$$

Here, 'c' is the speed of light, {xt, yt} is the (unknown) coordinates of the target UE, {xi, yi} is the coordinates of a (known) TP, and {x1, y1} is the coordinates of a reference TP (or another TP). (Ti-T1) is a transmission time offset between the two TPs, which may be referred to as "real time difference" (RTD), and 'ni' and 'nl' may represent values related to UE TOA measurement errors.

E-CID (Enhanced Cell ID): In cell ID (CID) positioning, the location of a UE may be measured based on geographic information about the serving ng-eNB, serving gNB and/or serving cell of the UE. For example, the geographic information about the serving ng-eNB, the serving gNB, and/or the serving cell may be obtained by paging, registration, or the like.

For E-CID positioning, an additional UE measurement and/or NG-RAN radio resources may be used to improve a UE location estimate in addition to the CID positioning method. In the E-CID positioning method, although some of the same measurement methods as in the measurement control system of the RRC protocol may be used, an additional measurement is generally not performed only for positioning the UE. In other words, a separate measurement configuration or measurement control message may not be provided to position the UE, and the UE may also report a measured value obtained by generally available measurement methods, without expecting that an additional measurement operation only for positioning will be requested.

For example, the serving gNB may implement the E-CID positioning method using an E-UTRA measurement received from the UE.

Exemplary measurement elements that are available for E-CID positioning are given as follows.

UE measurements: E-UTRA RSRP, E-UTRA RSRQ, UE E-UTRA Rx-Tx time difference, GSM EDGE random access network (GERAN)/WLAN RSSI, UTRAN common pilot channel (CPICH) received signal code power (RSCP), and UTRAN CPICH Ec/Io.

E-UTRAN measurements: ng-eNB Rx-Tx time difference, timing advance (TADV), and angle of arrival (AoA).

TADVs may be classified into Type 1 and Type 2 as follows.

TADV Type 1=(ng-eNB Rx-Tx time difference)+ (UE E-UTRA Rx-Tx time difference)

TADV Type 2=ng-eNB Rx-Tx time difference

On the other hand, an AoA may be used to measure the direction of the UE. The AoA may be defined as an estimated angle of the UE with respect to the location of the UE counterclockwise from a BS/TP. A geographical reference direction may be North. The BS/TP may use a UL signal such as a sounding reference signal (SRS) and/or a DMRS for AoA measurement. As the arrangement of antenna arrays is larger, the measurement accuracy of the AoA is higher. When the antenna arrays are arranged at the same interval, signals received at adjacent antenna elements may have a constant phase change (phase rotation).

UTDOA (Uplink Time Difference of Arrival): UTDOA is a method of determining the location of a UE by estimating the arrival time of an SRS. When the estimated SRS arrival time is calculated, a serving cell may be used as a reference cell to estimate the location of the UE based on the difference in arrival time from another cell (or BS/TP). In order to implement the UTDOA method, an E-SMLC may indicate the serving cell of a target UE to indicate SRS transmission to the target UE. Further, the E-SMLC may provide a configuration such as whether an SRS is periodic/aperiodic, a bandwidth, and frequency/group/sequence hopping.

A SoftV2X system may be a system in which a SoftV2X server receives a VRU message or a personal safety message (PSM) from a vulnerable road user (VRU) or a V2X vehicle and transfers information on a neighbor VRU or vehicle based on the VRU message or the PSM message or may analyze a road condition, etc. on which neighbor VRUs or vehicles move and may transmit a message informing a neighbor VRU or vehicle of a collision warning, etc. based on the analyzed information (e.g., through a downlink signal) via V2X communication using a UU interface. Here, the VRU message may be a message transmitted to the SoftV2X server through the UU interface, and may include mobility information about the VRU, such as a position, a movement direction, a movement path, and a speed of the VRU. That is, the SoftV2X system may use a method of receiving mobility information of VRUs and/or vehicles related to V2X communication through the UU interface and controlling a driving route or a VRU movement flow of the VRU, etc. based on the mobility information received by the softV2X server, such as a network. The SoftV2X system may be configured in relation to V2N communication.

User equipment or pedestrian equipment (VRU device) that is difficult to perform direct communication (PC5, DSRC) related to V2X communication can provide or receive driving information and mobility information to nearby vehicles or VRUs through the SoftV2X system based on the UU interface. Through this, the user equipment or pedestrian equipment (VRU device) that is difficult to perform the direct communication (PC5, DSRC) can be protected from surrounding vehicles.

Softv2X Location Recognition Technology Using Ultrasonic Waves

In conventional V2X technologies, a device generates a message basically based on the position thereof and transfers the message to nearby vehicles. Upon receiving the generated message, devices perform or provide safety services such as detecting the risk of collision by comparing the message with positions thereof. For these safety services, accuracy of an absolute position is an important prerequisite for a V2X safety system. However, many devices use a GPS to recognize the positions thereof. Since technology using the GPS is based on reception of signals transmitted by a satellite, performance may deteriorate according to weather or according to whether the devices are inside of a building or on an overpass. Therefore, in a specific rea such as a school zone or a crosswalk, more accurate location recognition technology for minimizing performance degradation described above is required.

The proposed disclosure proposes location recognition technology for improving V2X position performance through an auxiliary device of a ground station in an area in which an error of the GPS is large or the GPS does not operate. For example, the above-described device of the ground station that assists the GPS may provide nearby V2X devices with an opportunity for more accurate position recognition using an ultrasonic (or high-frequency) sound wave signal in order to compensate for shortcomings of the movement speed of conventional radio waves. In this case, a V2X device or a UE may receive a signal or a sound wave signal of the device of the ground station using a simple microphone mounted thereon and measure a received time of the signal, thereby more accurately recognizing or measuring the position thereof.

Figure 11:
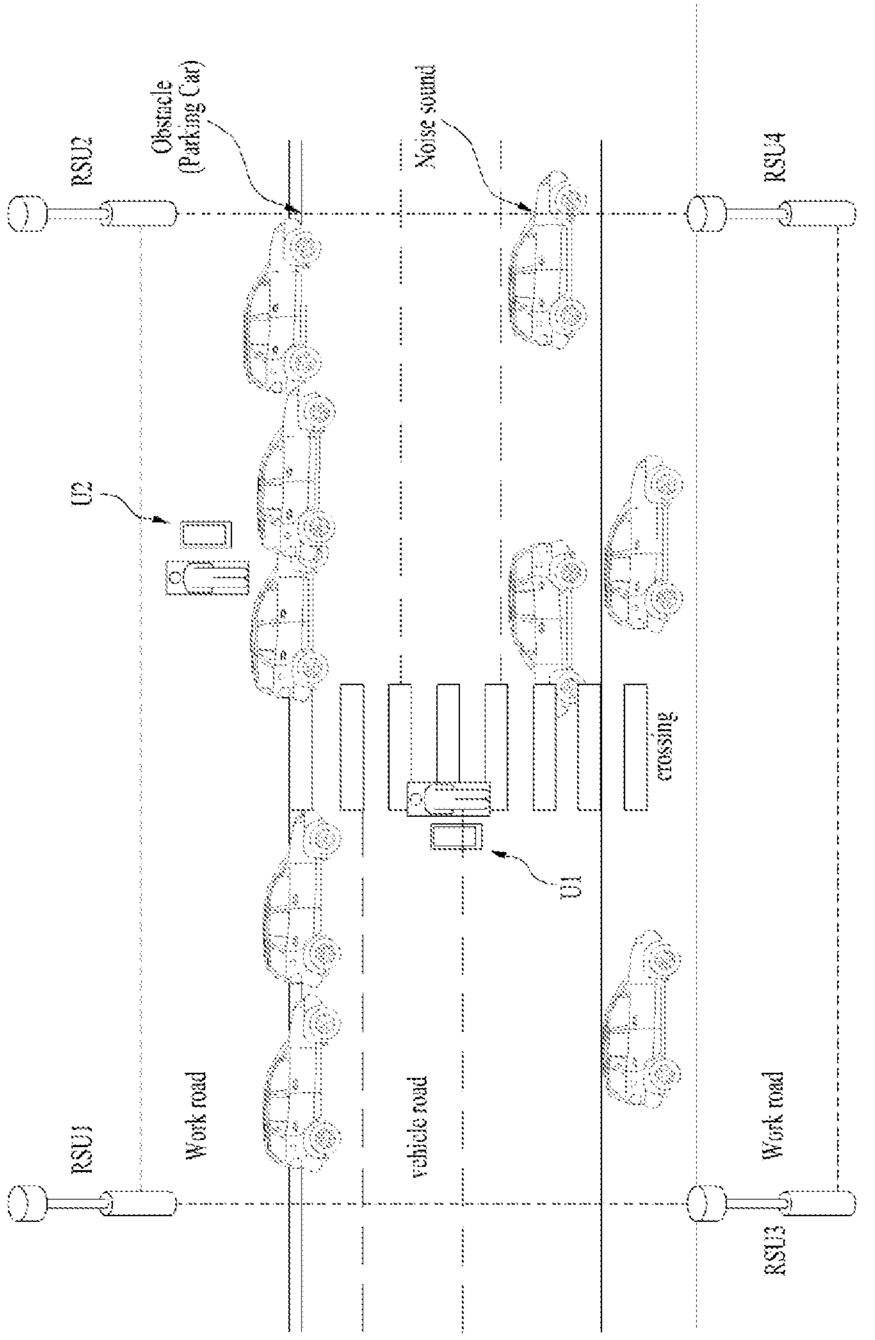
FIGS. 11, 12, and 13 are diagrams for explaining a method of recognizing a position by a V2X device or a UE based on a signal generated from an auxiliary device of a ground station.
Figure 12:
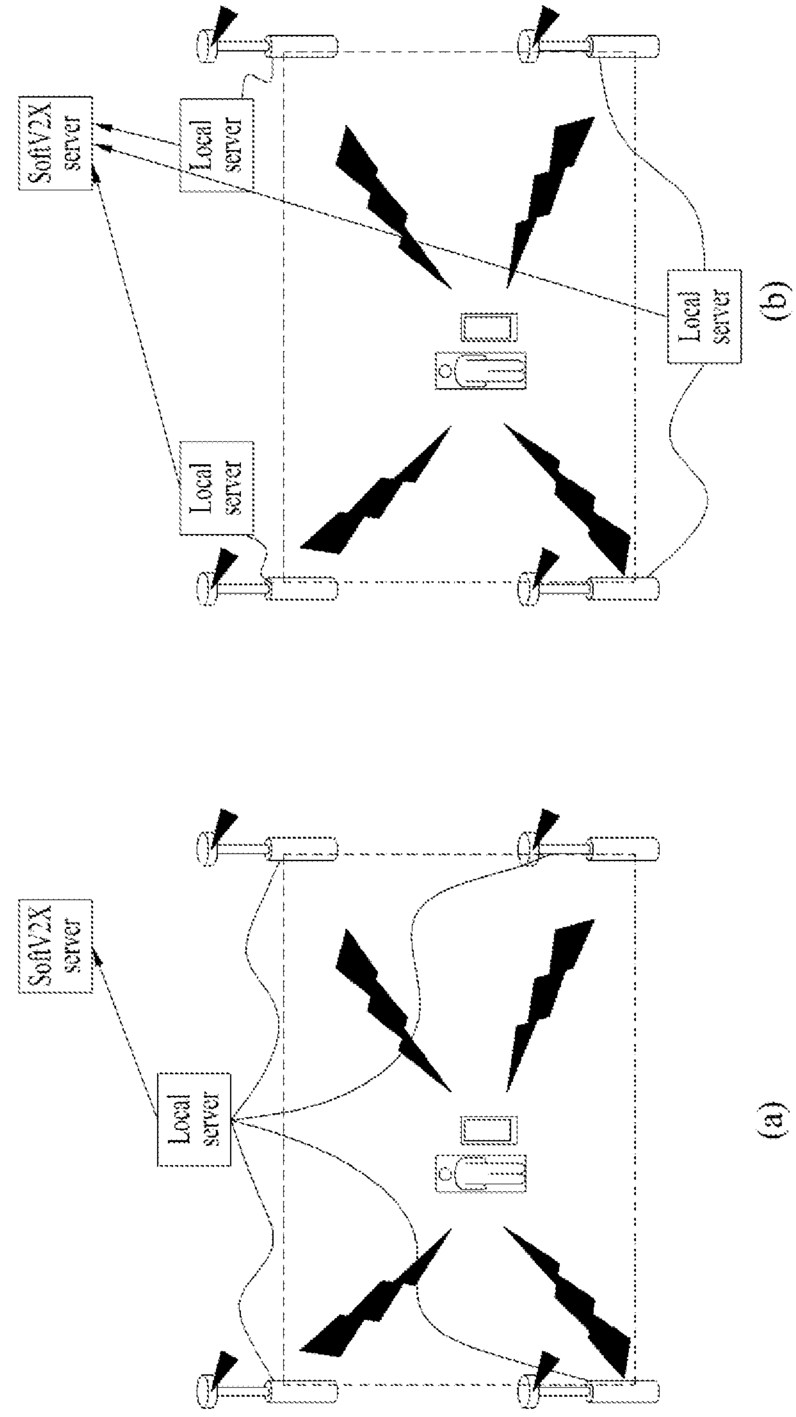
Figure 13:
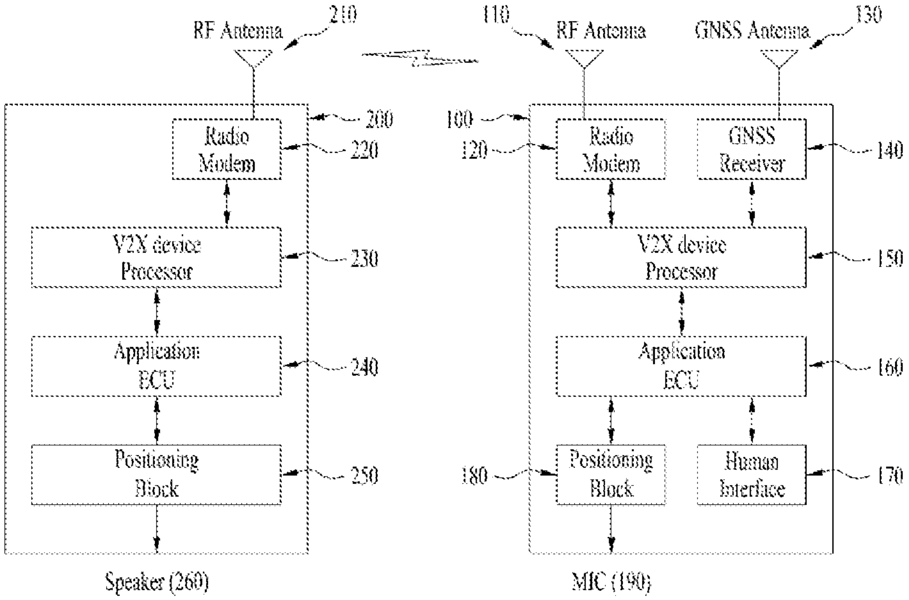

FIGS. 11, 12, and 13 are diagrams for explaining a method in a V2X device or a UE recognizes the position thereof based on a signal generated from an auxiliary device of a ground station.

Referring to FIG. 11, a system or an auxiliary device of a ground station protecting a VRU may assist the V2X device (or the UE or VRU) to measure an accurate position of the V2X device in an environment in which there is a crosswalk in front of a school zone.

Specifically, VRUs or V2X devices may announce presence thereof through a PSM (or VRU awareness message (VAM)) in order to protect pedestrians and/or jaywalking children who are difficult to see well due to parked (GPS) vehicles. However, if position information included in the PSM is inaccurate, the effect of a safety service through the PSM is inevitably reduced greatly.

In order to improve position recognition or position measurement performance even in this environment, an RSU is installed at the corner of a related area and continuously transmits, through a speaker unit, a sound wave that pedestrians are incapable of hearing. The VRUs or V2X devices may perform relative positioning with respective RSUs based on a corresponding signal and estimate or measure absolute positions thereof based on previously known absolute positions of the RSUs.

Hereinbelow, a method in which a V2X or VRU system exchanges preliminary information through communication with an RSU that includes a locally installed ultrasonic device, and a method in which the V2X or VRU system efficiently operates a service such as position measurement based on the ultrasonic device will be described in detail. Here, the position measurement based on a sound wave signal may use a method such as time difference of arrival (TDOA) in which position measurement is performed using a microphone of the V2X device based on a received time difference of a sound wave signal transmitted by the RSU.

In this regard, referring to FIGS. 12(*a*) and 12(*b*), a local server or a first server may deliver information about a sound wave signal that needs to be transmitted or sent through a wired device or wired connection with a speaker device included in an RSU. Here, the local server or the first server may be connected to a V2N server (SoftV2X server), thereby expanding the above-described service through connection with V2X devices related to the V2N server. For example, referring to FIG. 12(*a*), all speaker devices (or sound wave devices included in RSUs) may be connected to one local server. Meanwhile, when crossing a road as shown in FIG. 12(*b*), the sound wave devices included in the RSUs may be connected to at least two or more local servers.

Specifically, referring to FIG. 13, an RSU, which includes a sound wave device generating a sound wave signal or an ultrasonic signal as described above, may basically include a V2X radio modem 220 for V2X communication, a V2X device processor 230, and an application ECU 240 that generates a message and provides a safety service. The RSU may further include a positioning block 250 for providing a position service. Here, the positioning block 250 may be connected to the application ECU and then to a V2X system to provide a position recognition service. The sound wave device or a speaker 260 may transmit a (sound wave) signal (or a beacon signal or a beacon sound wave signal) generated by the positioning block 250 to nearby V2X devices.

A V2X device or a UE (reception (Rx) device), which receives the sound wave signal and estimates a position thereof, may basically include a V2X radio modem for V2X communication, a V2X device processor 130, and an application ECU 140 for generating a message and providing a safety service. The V2X device or the UE may further include a positioning block 2180for providing a position service. The V2X device or the UE measures a position basically based on a GNSS device such as a GPS. However, the GPS may not operate properly when there are many errors or when the V2X device or the UE is indoors. In this case, the V2X device or the UE obtains auxiliary position information through the positioning block 180. The positioning block 180 may be connected to the application ECU 140 and the V2X system to provide a position recognition service. The V2X device or the UE may transmit a sound wave signal received through a microphone 190 included therein to the positioning block 180 and recognize the position thereof through a TDOA algorithm using the positioning block 180.

Hereinbelow, a sound wave signal transmitted and received between the V2X device or the UE and/or the RSU will be described in detail.

Figure 14:
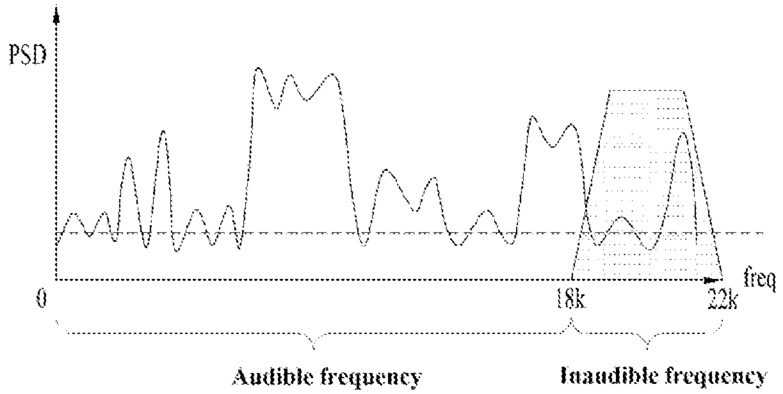
FIGS. 14 and 15 are diagrams for explaining a sound wave signal transmitted and received for a TDOA between an RSU and a V2X device.
Figure 14:
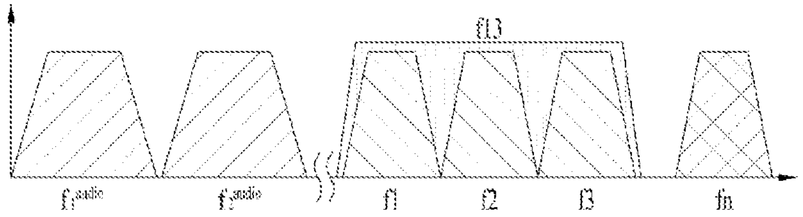
Figure 15:
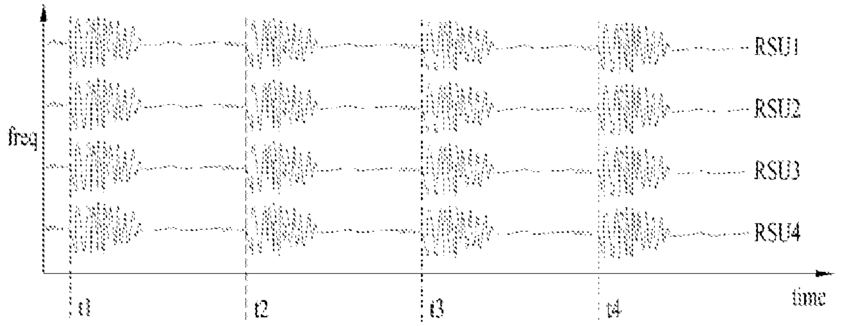
Figure 15:
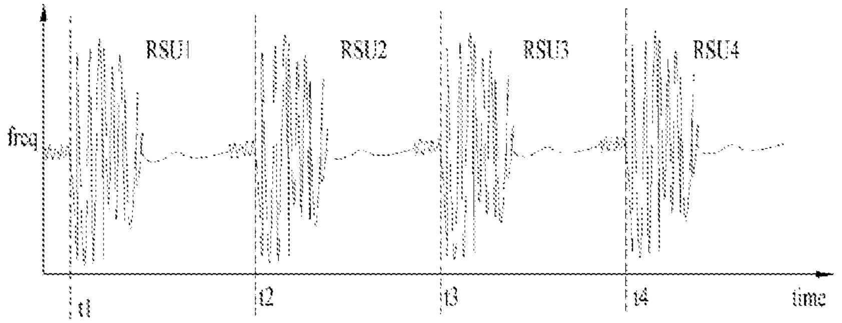
Figure 15:
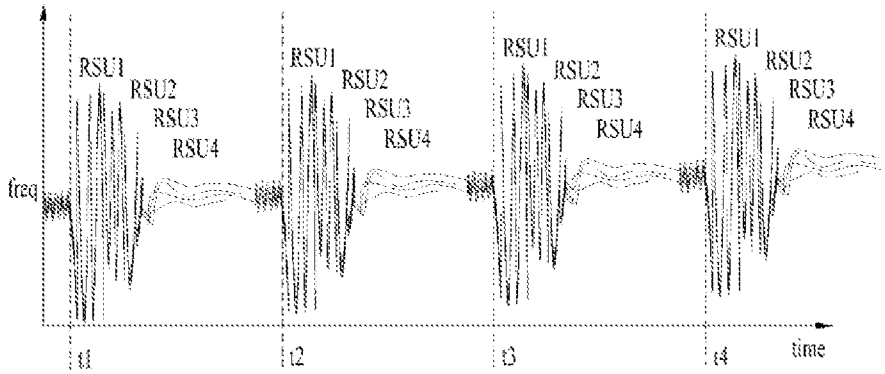

FIGS. 14 and 15 are diagrams for explaining a sound wave signal transmitted and received for a TDOA between an RSU and a V2X device.

Referring to FIGS. 14(*a*) and 14(*b*), the sound wave signal may be a sound wave signal occurring in an inaudible frequency band. Generally, a frequency band that is detectable by humans is known to be 2 kHz to 18 kHz. Performance of microphones of conventionally used devices such as smartphones may be set based on 22 kHz. The RSU and the V2X device may use a band of 18 kHz to 22 kHz to transmit a sound wave signal for position recognition. Specifically, an available frequency band may be divided again into multiple frequency bands for a service. In addition, the RSU may also transmit audible sound wave signals such as VRU protection voice guidance, disabled person guidance voice signals, and traffic light warning sound. The audible sound wave signals may also be used in sound wave-based position recognition described above. For example, as shown in FIG. 14(*b*), the above-described sound wave-based position recognition may be performed using frequency bands f1 to f3 (f13).

In TDOA technology, synchronized RSUs simultaneously transmit respective signals. The Rx UE or the Rx device measures the positions of the RSUs by analyzing the difference (i.e., TDOA) between the signals and acquires an absolute position thereof based on the TDOA and previously acquired information of the RSUs (i.e., position information of the RSUs). To this end, the RSUs need to transmit distinguishable sound wave signals. Here, there are three methods or types for transmitting the distinguishable sound wave signals: a method of transmitting the distinguishable sound wave signals with a frequency difference (frequency-division multiplexing (FDM)), a method of transmitting the distinguishable sound wave signals with a time difference (time-division multiplexing (TDM)), and a method of transmitting the distinguishable sound wave signals with a signal form difference (code-division multiplexing (CDM)).

Referring to FIG. 15(*a*), sound wave signals of the RSUs may be distinguished through sound wave signals separated in a frequency band (FDM or FDMA type). Each of the RSUs transmits a sound wave signal using a predetermined frequency band. In this case, waveforms of the sound waves used may be the same or different depending on frequency characteristics. In this case, the Rx device recognizes the position thereof within a period T1 based on the sound wave signals transmitted by the RSUs. To improve position performance, a transmission (Tx) device (i.e. RSU) transmits a sound wave signal at a preset period (t1→t2→t3). On the other hand, this method may not increase maximum performance because a frequency band corresponding to each sound wave signal is narrowed.

Referring to FIG. 15(*b*), each of the RSUs may transmit a sound wave signal with a time difference (TDM or TDMA type). In this case, since the sound wave signal used in each RSU is transmitted over a wide frequency band, each RSU may generate a sound wave signal optimized for a transmission environment. However, this method may transmit only a sound wave signal of one RSU at each time, and thus, the Rx device or Rx UE may perform position measurement only after all sound wave signals until a fourth time t4 are received.

Referring to FIG. 15(*c*), each of the RSUs may transmit a sound wave signal in a different form of a sound wave (or waveform) (CDM method or CDMA type). In this method, all sound wave signals are transmitted during one time period (t1, t2, t3, or t4) while using all of wide frequency bands, and thus, the Rx UE or the Rx device may measure the position thereof immediately after one period. Meanwhile, the Rx UE or the Rx device may need to extract a corresponding sound wave signal for each RSU from the sound wave signals received during one period.

Specifically, the method of distinguishing between frequencies (or FDM method) has the advantages of being easy to separate a sound wave signal of each anchor node (or RSU) and receiving a sound wave signal (anchor signal) for local positioning during every period. However, because the frequency band of a sound wave signal is narrow, there is a disadvantage that position measurement performance of the Rx UE is lowered when noise and/or interference exists. In this regard, the FDM method may be used in an environment in which noise is low (or a communication environment in which a signal-to-interference plus noise ratio (SINR) or a signal-to-noise ratio (SNR) is less than a predetermined threshold) or a situation in which high performance and rapid position measurement are required (the Rx UE moves at a predetermined threshold speed or higher).

The TDM method (a method of distinguishing sound wave signals by a time unit) is advantageous in that it is easy to separate a sound wave signal of each anchor node (or RSU) and sound wave signals are robust against noise by using a wide frequency band. However, it may take a long time to perform position measurement based on the sound wave signal. In this regard, the TDM method is useful for a device requiring high position measurement performance in a high-noise environment (or a communication environment in which the SINR or the SNR is greater than a predetermined threshold) and moving slowly (Rx UE moving at a speed less than a predetermined threshold speed).

The CDM method (the last method of distinguishing sound wave signals by a signal form) has the advantages of being robust against noise because sound wave signals use a wide frequency band and obtaining a fast positioning result because a reception or transmission period of a sound wave signal for position measurement is fast. However, there are also difficulties in separating a sound wave signal of each anchor node (or RSU). In this regard, the CDM method may be useful for a high-performance Rx device capable of obtaining a fast positioning result (e.g., capable of performing fast separation of sound wave signals) in a high-noise environment (or a communication environment in which the SINR or the SNR is equal to or greater than a predetermined threshold value).

The advantages and disadvantages of the above-described transmission methods (FDM type, TDM type, and CDM type) may vary depending on a surrounding transmission environment and system installation characteristics. Hereinafter, a method of determining a sound wave signal transmission method in consideration of the advantages and disadvantages of each transmission method will be described in detail.

Figure 16:
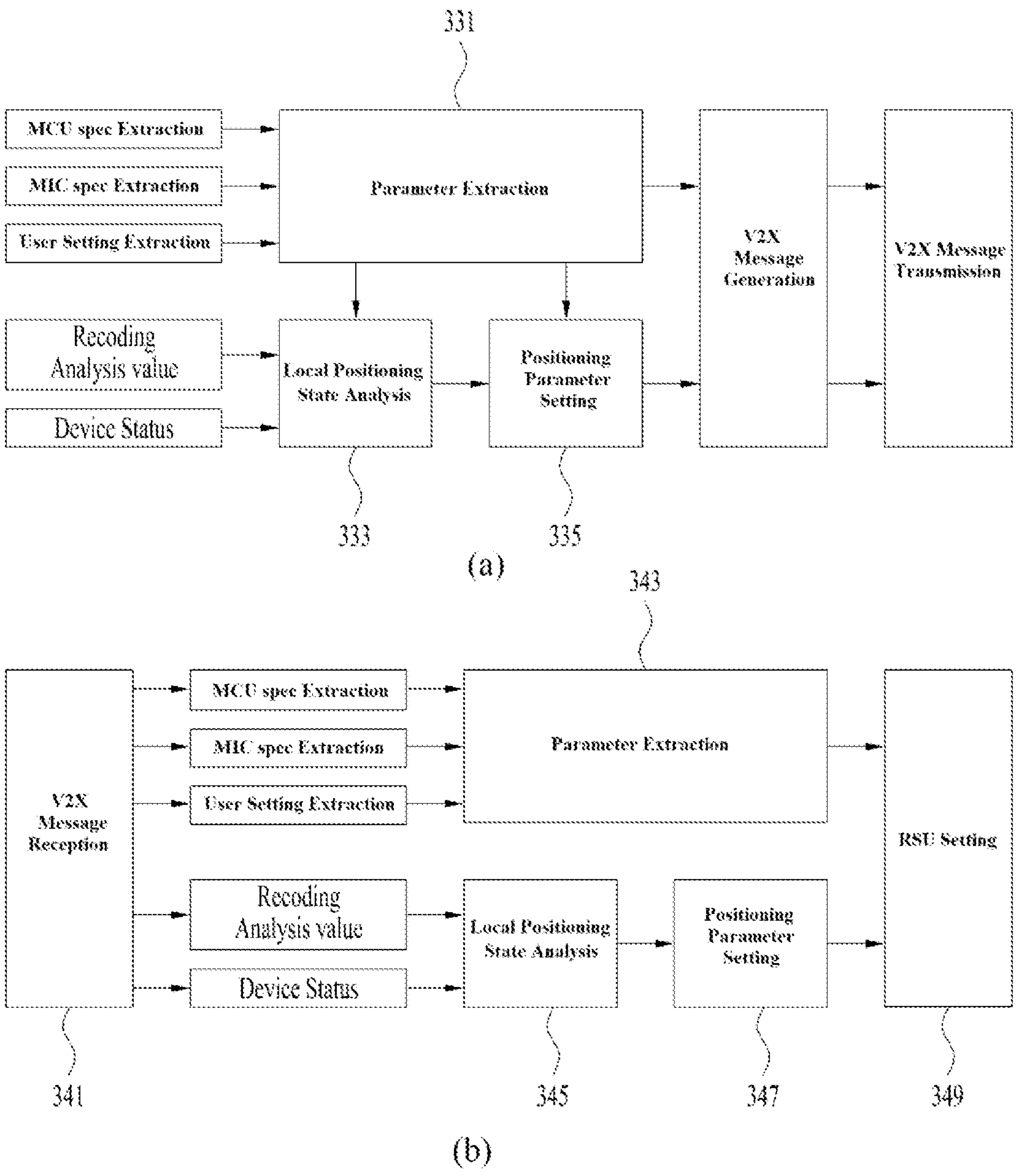
FIG. 16 is a diagram for explaining a method of obtaining information about the state of an Rx UE and/or a channel state related to determination of one transmission method among transmission methods.

FIG. 16 is a diagram for explaining a method of obtaining information about the state of an Rx UE and/or a channel state related to determination of one transmission method among the above transmission methods.

Referring to FIG. 16(*a*), the Rx UE may analyze capabilities and state thereof and directly determine parameters related to sound wave positioning based on the analysis results. Specifically, the Rx UE may transmit capability information and state information, which are information for determining the transmission method (or multiplexing type), through a V2X message, etc. For example, the Rx UE may extract an MCU specification, a microphone (hereinafter referred to as a MIC) specification, and a user setting value (user setting information) as the capability information, measure or extract the mobility of the UE as the state information, and analyze a signal received through a MIC. The Rx UE may extract parameters related to local positioning based on the capability information (331). Additionally, the Rx UE may analyze a local positioning state based on the analysis result of surrounding signals and/or the state information (333). The Rx UE may set or determine local positioning parameters, such as a multiplexing type, a frequency band, and/or a sound wave waveform, based on the extracted parameters and a local positioning state (335). The Rx UE may generate a V2X message including the extracted parameters and/or the positioning parameters and transmit the generated V2X message to nearby RSUs. The parameters included in the V2X message may be used to determine parameters for a positioning service based on sound wave signals provided by the nearby RSUs.

Alternatively, referring to FIG. 16(*b*), the RSU may receive a V2X message including capability information and/or state information related to the Rx UE from a nearby Rx UE (341) and determine or set parameters such as a multiplexing type, a frequency band, and/or a sound wave waveform for a positioning service based on a sound wave signal. Specifically, the RSU may acquire an MCU specification, a MIC specification, and a user setting value from the capability information included in the V2X message and extract parameters based on the obtained values (343). The RSU may acquire or extract mobility information of the UE or a signal analysis result from the state information (345). In this case, the RSU may set positioning parameters (a multiplexing type, a frequency band, and/or a sound wave waveform) related to positioning based on the extracted state information and capability information (347 and 349).

Figure 17:
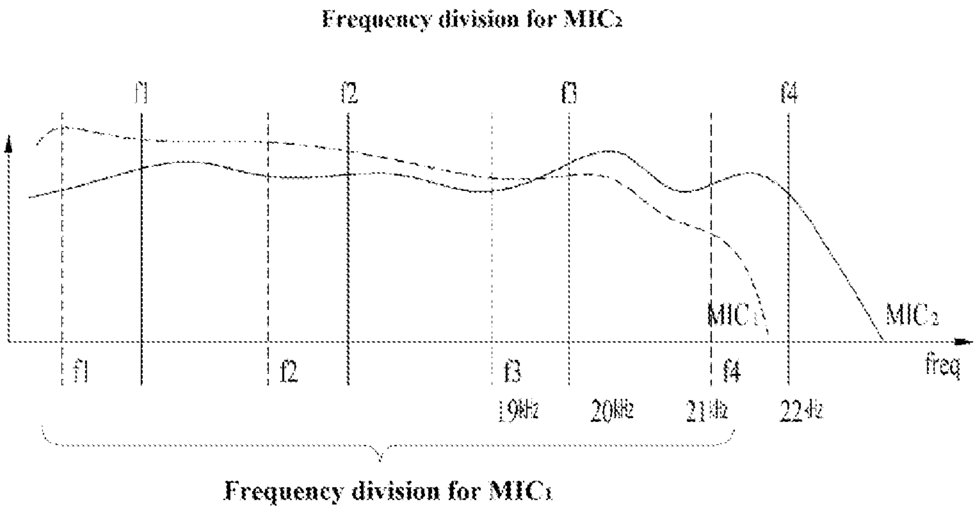
FIGS. 17, 18, and 19 are diagrams for explaining a method of determining, by an RSU or an Rx device, one of transmission methods based on the state of a UE and a surrounding environment.
Figure 18:
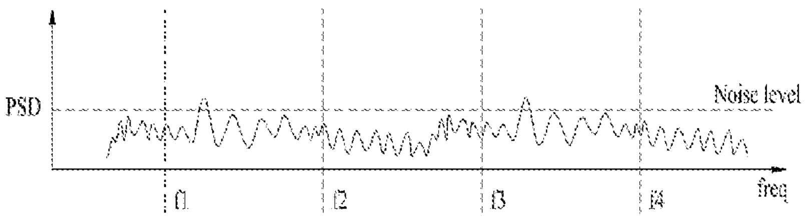
Figure 18:
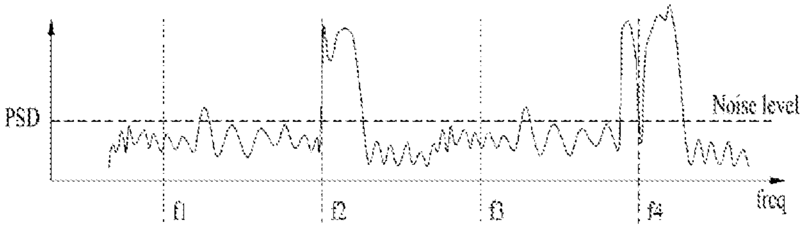
Figure 19:
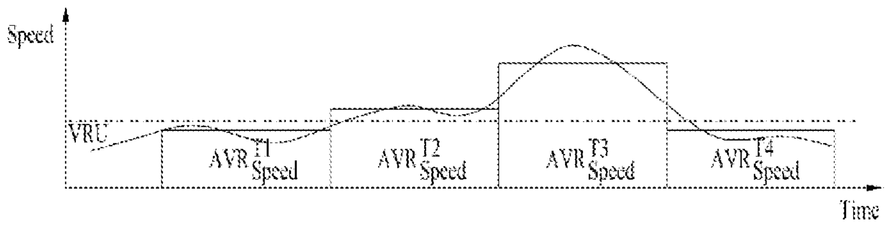

FIGS. 17, 18, and 19 are diagrams for explaining a method of determining, by an RSU or an Rx device, one of transmission methods based on the state of a UE and a surrounding environment.

First, the RSU may set a frequency band for sounding wave positioning for Rx UEs based on a MIC specification of the Rx device.

Specifically, referring to FIG. 17, the RSU (or Rx device) may set a frequency band using a MIC specification included in a V2X message. For example, in the case of MIC2, which may receive a sound wave signal up to a frequency band of 22 kHz or higher, the RSU (or anchor node) may set a frequency band of a sound wave signal for an Rx UE that has transmitted information about the specification of MIC2 up to 22 kHz or higher. In contrast, in the case of MIC1 which may receive a sound wave signal up to 21 kHz, the RSU (or anchor node) may set a frequency band of a sound wave signal for an Rx UE that has transmitted information about the specification of MIC1 up to 21 kHz.

The RSU and/or the Rx UE may analyze a sound wave using a MIC of the Rx UE and analyze a channel state or noise information based on the sound wave. The RSU and/or the Rx UE may provide an adaptive sound wave positioning service based on the analyzed channel state or noise information.

The Rx UE may receive setting information including information about a frequency band set for sound wave positioning. Based on the setting information, the Rx UE may analyze surrounding sound using the MIC at a period at which the RSU (or anchor node) does not transmit a signal and analyze the channel state or the noise information based on the analysis results of the surrounding sound.

Specifically, referring to FIG. 18(*a*), there may be noise only below a preset noise level in all frequency bands set for a sound wave signal for sound wave-based position measurement of the RSU. In this case, the Rx UE may transmit the noise information (or channel state information) to the RSU (or nearby RSUs), and the RSU (or nearby RSUs) may transmit a sound wave signal using an FDM-based transmission method based on the noise information.

Alternatively, referring to FIG. 18(*b*), noise above the preset noise level may be detected at a second frequency F2 and a fourth frequency F4 among a frequency band set in relation to sound wave positioning. In this case, a sound wave signal including the second frequency F2 and the fourth frequency F4 are subjected to strong signal interference due to surrounding noise, and local positioning performance of the sound wave signal according to the above-described FDM method may be greatly reduced. In this case, the Rx UE may transmit the noise information to the RSU, and the RSU may transmit the sound wave signal based on a TDM transmission method or a CDM transmission method among the transmission methods based on the noise information. Alternatively, the RSU may transmit the sound wave signal using the CDM transmission when the speed of the Rx UE is equal to or higher than a preset threshold speed and transmit the sound wave signal using the TDM transmission method when the speed of the Rx UE is less than the preset threshold speed, based on the noise information and the state information.

That is, the RSU may determine one of the transmission methods based on the noise information and/or the speed of the Rx UE.

Specifically, referring to FIG. 19, the Rx UE may calculate an average speed at each time based on the speed thereof. When the calculated average speed is less than a preset threshold speed, the Rx UE may not require rapid local positioning. However, if the calculated average speed is equal to or greater than the preset threshold speed, the Rx UE may require rapid local positioning. For example, the average speed of the Rx UE may be less than the threshold speed in a first time interval t1 and a fourth time interval t4. In this case, the sound wave signal may be transmitted based on the TDM transmission method. In contrast, the sound wave signal may be transmitted based on the CDM or FDM transmission method in a second time interval t2 and a third time interval t3.

Additionally, the Rx UE and/or RSU may determine one of the transmission methods by further considering the specification or processing capability of an MCU of the UE. For example, when the MCU processing capability of the Rx UE is high (is equal to or greater than a threshold processing capability), the RSU may determine the CDM transmission method among the transmission methods and transmit the sound wave signal based on the CDM transmission method. In contrast, when the MCU processing capability of the Rx UE is low, the RSU may transmit the sound wave signal based on the FDM or TDM transmission method.

Hereinbelow, a method in which the Rx device or the V2X device performs positioning based on the above-described sound wave signal.

Figure 20:
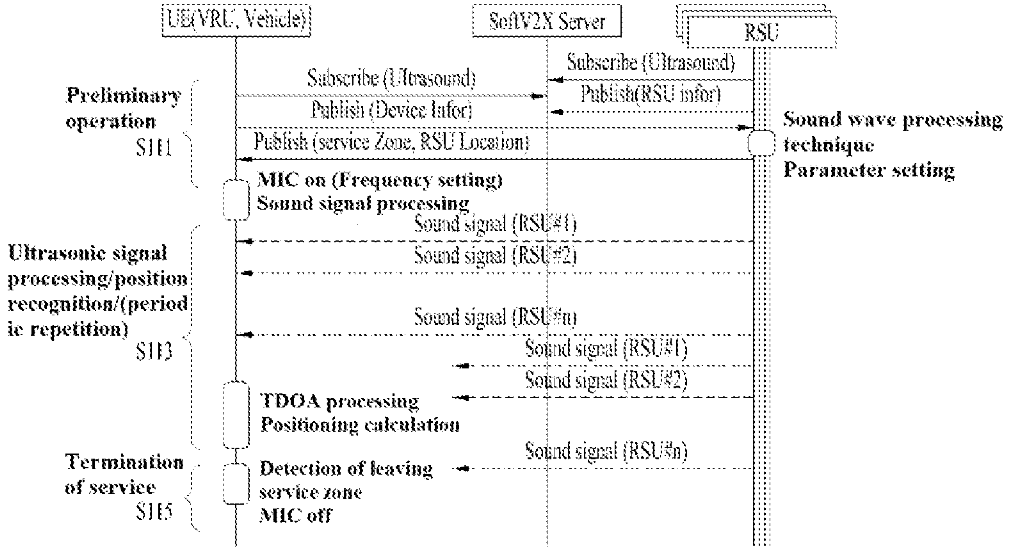
FIGS. 20 and 21 are diagrams for explaining a method of measuring a position by an Rx device based on a sound wave signal.
Figure 21:
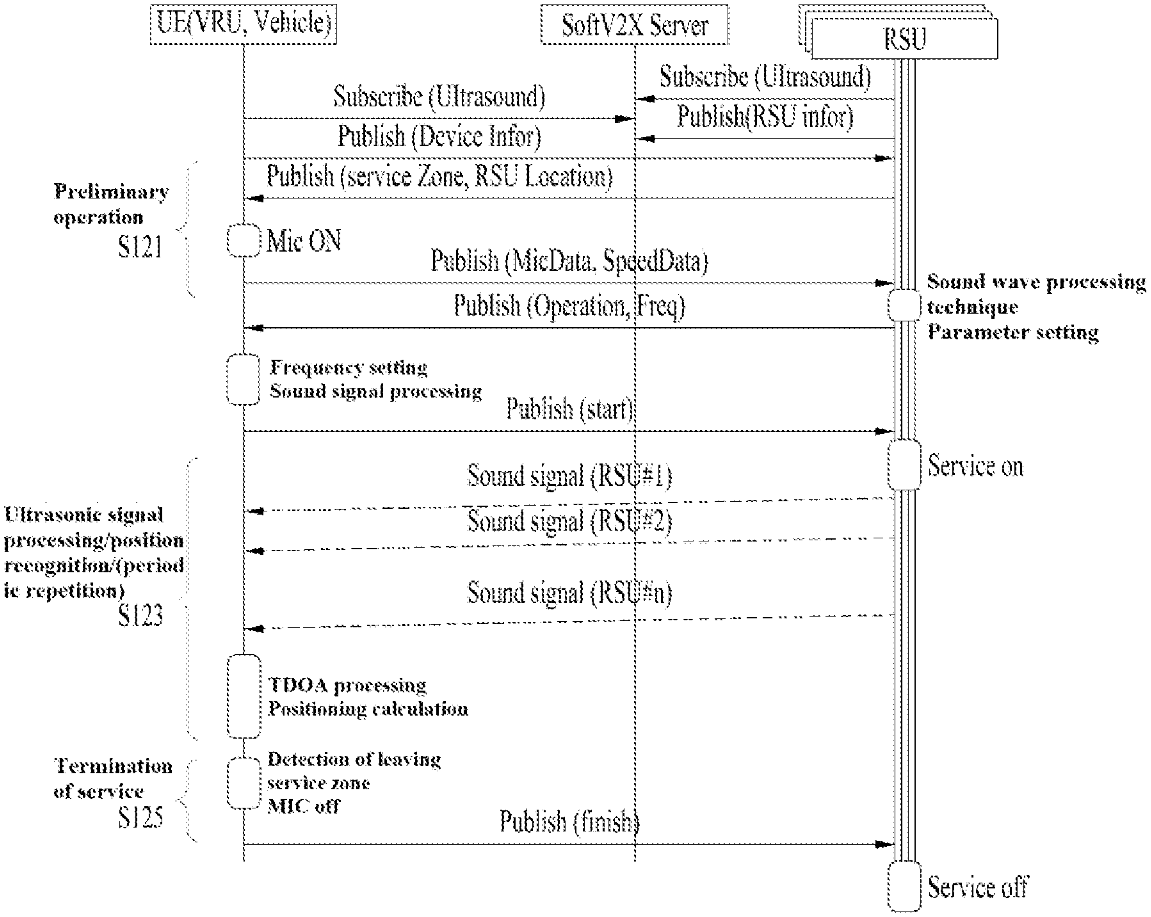

FIGS. 20 and 21 are diagrams for explaining a method of performing positioning by an Rx device based on the above-described sound wave signal.

The Rx device, a V2N (hereinafter referred to as SoftV2X) server, and/or a plurality of RSUs may perform operations for setting related to positioning based on the sound wave signal and perform operations for positioning based on the sound wave signal according to setting.

Referring to FIG. 20, the SoftV2X server and the Rx UE may perform a preliminary operation, which is a setting operation for positioning based on a sound wave signal (S111). Specifically, an RSU that provides a positioning service based on the sound wave signal may subscribe to the SoftV2X server. Each of the plurality of RSUs may publish information about the RSU to the SoftV2X server. In addition, the Rx UE may subscribe to the SoftV2X server in order to receive a positioning service based on the sound wave signal and publish capability information thereof including a MIC specification, an MCU processing capability, and/or a user setting value to the RSU (or SoftV2X server). The RSU may set a frequency band optimized for performance of a plurality of MICs (or a plurality of MIC specifications) included in a plurality of Rx UEs based on the capability information and transmit a sound wave signal. In addition, the Rx UE may receive transmission parameters for a sound wave signal used for each position of a service zone from the SoftV2X server and prepare to perform a sound wave-based positioning operation based on the parameters.

Next, the Rx UE may receive sound wave signals from the plurality of RSUs and measure the position thereof using a TDoA calculated based on the received sound wave signals and/or using position information of the plurality of RSUs (S113). Specifically, each of the plurality of RSUs (or each of a plurality of RSUs located in a specific zone) may generate and transmit a preset sound wave signal through the preliminary operation. Here, the plurality of RSUs may transmit the preset sound wave signals based on a transmission method determined among the FDM transmission method, the TDM transmission method, and the CDM transmission method described with reference to FIG. 15. The Rx UE may receive the sound wave signals based on the one transmission method, calculate a TDoA based on the received sound wave signals, and calculate the position thereof based on the calculated TDoA and position information of the RSUs.

Next, when the Rx UE leaves a specific zone (i.e., a service zone of the RSUs), a local positioning service based on the sound wave signals may be terminated (S115). In this case, the Rx UE may turn off the MIC to terminate the local positioning service based on the sound wave signals. Meanwhile, even if the Rx UE leaves the specific zone, the plurality of RSUs may periodically transmit sound wave signals for local positioning.

Referring to FIG. 21, the Rx UE, the SoftV2X server, and the RSUs may perform an additional preliminary operation in addition to the preliminary operation described with reference to FIG. 20 (S121). Specifically, the Rx UE may receive information about a service zone related to a sound wave signal-based positioning service and about the positions of the RSU(s) and turn on a MIC in order to receive the sound wave signal-based positioning service when entering the service zone. Thereafter, the Rx UE may measure surrounding noise using the MIC and acquire noise information about a channel environment based on the measured surrounding noise. Additionally, the Rx UE may measure state information about a movement state thereof. Thereafter, the Rx UE may transmit the noise information and the state information to the RSUs (or the SoftV2X server). The RSU(s) may determine a noise-robust frequency band and a transmission method based on the noise information. In addition, the RSU(s) may determine the transmission method by further considering a state value such as the speed of the Rx UE. The Rx UE may receive the transmission method related to the sound wave-based positioning service and setting information about a frequency band and prepare a positioning operation based on the setting information.

Next, the Rx UE may perform an operation for position measurement or position recognition based on sound wave signals (S123). Specifically, the Rx UE may inform the RSU(s) of information about a preparation state of the positioning operation. The RSUs may (sequentially) generate and transmit sound wave signals according to the above-described setting information based on the information about the preparation state. The Rx UE may perform position recognition or positioning by calculating a TDoA between the sound wave signals. In this case, upon failing to correctly receive at least one of the sound wave signals, the Rx UE may request publication again and further receive the at least one sound wave signal or the sound wave signals.

Next, the Rx UE may perform a service termination operation when leaving a service zone (S125). Specifically, the Rx UE may turn off a MIC and terminate or turn off the sound wave-based positioning operation. Additionally, the Rx UE may transmit information about the termination of the sound wave-based positioning operation to the RSU(s) to instruct the RSU(s) not to perform the operation of generating and transmitting the sound wave signals.

Alternatively, the RSU(s) may measure the position of the Rx UE based on a sound wave signal generated from the Rx UE and provide information about the measured position of the Rx UE to the Rx UE. That is, unlike the description given with reference to FIGS. 20 and 21, the RSU(s) may receive the sound wave signal generated by the Rx UE using MICs and measure the position of the Rx UE based on the received sound wave signal. Specifically, in relation to the above-described preliminary operation, the RSU(s) may provide capability information about MIC specifications of the RSUs to the Rx UE and acquire surrounding noise information based on MICs thereof. The Rx UE may measure mobility information thereof. When the Rx UE transmits setting information about setting of a frequency band, a sound wave waveform, and a timing related to the sound wave signal to the RSUs, the Rx UE may acquire the capability information from the RSUs, determine setting information about setting of the frequency band, the sound wave waveform, and the timing related to the sound wave signal based on at least one of the capability information or the mobility information, and provide the setting information to the RSUs. Alternatively, when at least one RSU (or reference RSU) among the RSUs transmits the setting information about setting of the frequency band, the sound wave waveform, and the timing related to the sound wave signal to the Rx UE, the at least one RSU may receive the mobility information from the Rx UE, determine the setting information about setting of the frequency band, the sound wave waveform, and the timing related to the sound wave signal based on the mobility information and the capability information, and provide the determined setting information to the Rx UE. Next, the RSU(s) may receive a sound wave signal corresponding to the setting information from the Rx UE. The RSU(s) may measure a TDoA of the sound wave signal of the Rx UE to measure the position of the Rx UE. For example, the reference RSU among the RSUs may receive reception times of the sound wave signal from the remaining RSUs and measure the position of the Rx UE based on a TDoA between a reception time of the sound wave signal by the reference RSU and the reception times of the sound wave signal by the remaining RSUs and on position information of the RSUs. The reference RSU may transmit the measured position of the Rx UE to the Rx UE.

Hereinbelow, the structure of a message transmitted and received between the RSU and the Rx UE in relation to a sound wave signal related to positioning will be described in detail.

Figure 22:
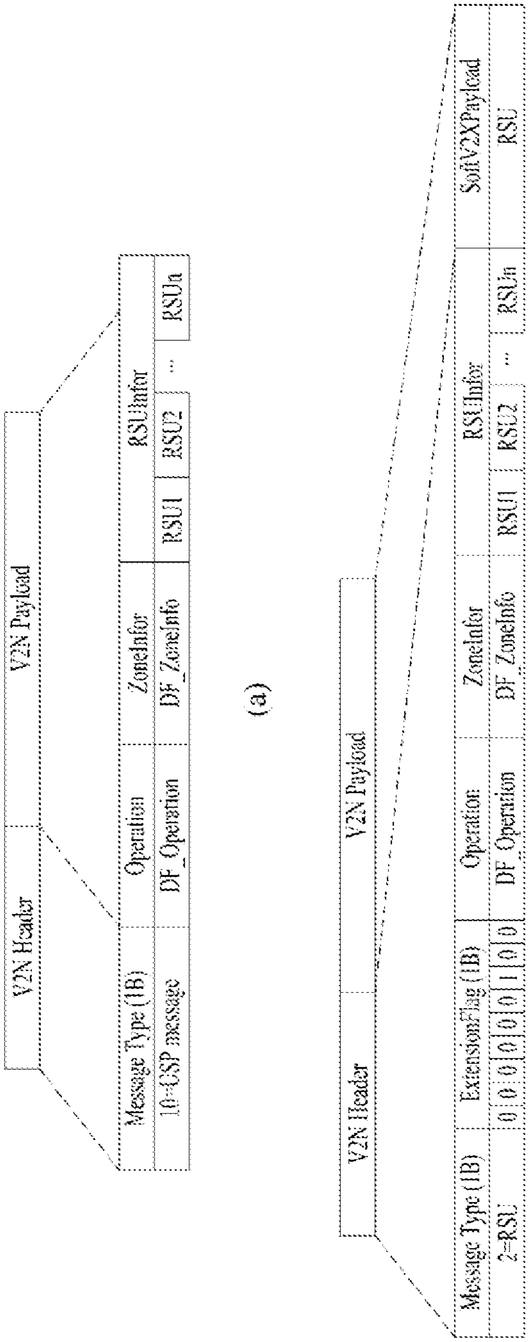
FIG. 22 is a diagram for explaining the structure of a message transmitted and received between an RSU and an Rx UE.

FIG. 22 is a diagram for explaining the structure of a message transmitted and received between the RSU and the Rx UE.

The RSU may transmit and receive a message including information related to local positioning based on any one of a first type message having the structure of FIG. 22(*a*) or a second type message having the structure of FIG. 22(*b*).

Referring to FIG. 22(*a*), the first type message may include a V2N header and a V2N payload. The V2N header may include a field related to a message type. The V2N payload may include an Operation container for a service operation, a ZoneInfor container that indicates a zone, and an RSUInfor container that indicates information about each RSU. Here, each RSUInfo container may include an individual container such as RSU1, RSU2, or the like.

Referring to FIG. 22(*b*), the second type message may include a V2N header and V2N payload. The V2N header of the message includes an extended flag field and may further include an Operation container, a ZoneInfor container that indicates a zone, and an RSUInfor container, based on the extended flag field.

Specifically, containers or fields included in the first type message or the second type message may be configured as shown in Table 5 below.

TABLE 5

```
ASN.1 Representation
DF_Operation        ;;= SEQUENCE {
  RequestCode         INTEGER, _0: Unknown, 1. LocationReq. 2. ChannelReq.
  AckCode             INTEGER, _0: Unknown, 1. ack. 2. Nack, 3.reqAck, 4.
  MICSpec             INTEGER, _0: Unknown, 1. Device1, 2. Device2, ...
  MICdata            String
}
ASN.1 Representation
DF ZoneInfo         ;;= SEQUENCE {
  ZoneLocation1       Position
  ZoneLocation2       Position
  NumRSU             INTEGER, _ 0~10.
  PositioningType     INTEGER, _0: Unknown, 1: FD_TDOA, 2:TD_TDOA 3:CD_TDOA
  FreqBand           INTEGER, _0: Unknown, 1: f1, 2:f2, 3:f3, 4:f4,...
  Timeinterval        INTEGER, _ unit msec
  SignalType          INTEGER, _0: Unknown, 1: chirp signal, 2:time signal 3:cdma signal,
}
ASN.1 Representation
DF_RSUInfo          ;;= SEQUENCE {
  RSU_Position       Position.
  Freq                INTEGER, _0: Unknown, 1: f1, 2:f2, 3:f3, 4:f4,...,
  Timeoffset          INTEGER, _ unit msec
}
```

Specifically, in the first type message and the second type message, the Operation container may include information about a request code and an acknowledge code required for operation. Additionally, the Operation container may also include information about a MIC specification and MIC data necessary for local positioning operation. The ZoneInfor container transmits information about a zone to be serviced. ZoneLocation1 and ZoneLocation2 indicate the positions of both vertices of the zone. Through ZoneLocation1 and ZoneLocation2, the position of the service zone is known. NumRSU indicates the number of RSUs installed for a positioning service. The corresponding value is equal to the number of RSUInfo. A FreqBand field indicates a frequency band used by a system. TimeInterval is a value that indicates an update cycle of a signal transmitted for position recognition. Lastly, SignalType is a field that previously indicates the type of a signal transmitted by an RSU. The RSUInfo container is a container that indicates information about each RSU and has a plurality of RSUInfor. The RSUInfo container includes an RSU_Position field that indicates the position of an RSU, a freq field that indicates request band information used for signal transmission, and a TimeOffset field, which is a field that indicates a time offset during transmission of a time period.

Based on the first type message or second type message defined in this way, a sound wave signal-based position measurement system and a V2X system may be connected.

As described above, the Rx UE may receive a sound wave-based position measurement service through a conventional V2X network and secure optimized positioning performance by operating the sound wave-based position measurement service more dynamically. In other words, the service and/or system related to position measurement may be efficiently operated or provided through connection between the system for locally providing a position recognition service and the V2X system.

Figure 23:
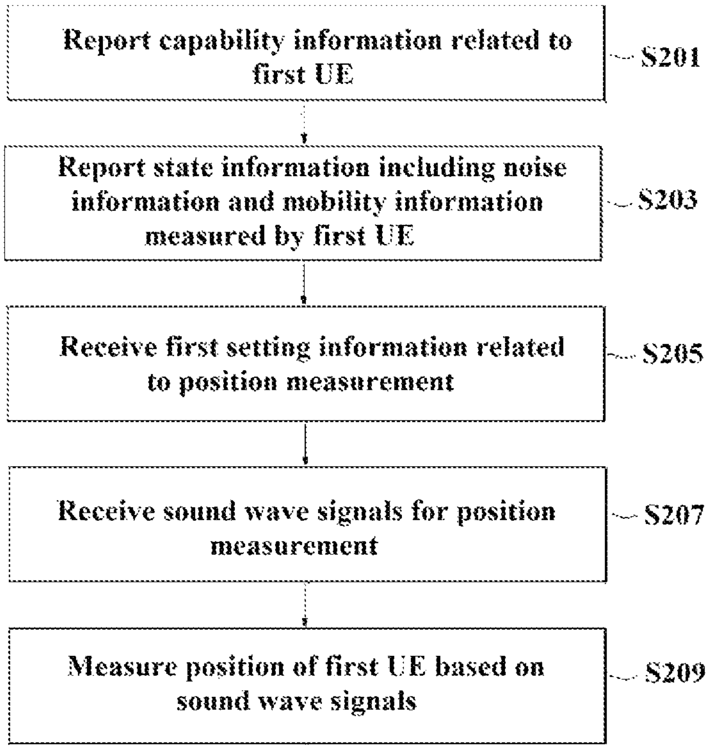
FIG. 23 is a flowchart for explaining a method of measuring a position by a first UE based on sound wave signals received from two or more devices.

FIG. 23 is a flowchart for explaining a method of measuring a position by a first UE based on sound wave signals received from two or more devices.

The first UE may correspond to the above-described Rx UE or Rx device, and the two or more devices may correspond to the above-described RSUs.

Referring to FIG. 23, the first UE may report capability information (S201). The capability information may include information about performance of a MIC of the first UE and/or performance of a processor of the first UE. Alternatively, the first UE may report the capability information after making a request for a subscription related to a position measurement service based on sound wave signals to a first server (or SoftV2X server). In this case, the first UE may receive second setting information, which includes service zones related to the position measurement service and/or position information about two or more devices, from at least one device (or reference device) among the two or more devices.

The first UE may report state information, which includes mobility information measured in relation to the first UE and noise information measured based on the MIC, to the at least one device (S203). The noise information may include information about the intensity of noise received in an initial frequency band set based on the second setting information. The mobility information may include information about a movement speed and/or a movement direction of the first UE. Alternatively, the noise information may include information about a frequency at which noise intensity equal to or greater than a first threshold value is measured in the initial frequency band.

The first UE may receive first setting information from the at least one device (S205). The first setting information may include information about one sound wave multiplexing type among a plurality of multiplexing types and/or information about a frequency band, based on the state information and/or the capability information. Here, the plurality of multiplexing types may include a TDM type, an FDM type, and a CDM type. Specifically, the at least one device may determine one of the plurality of multiplexing types based on the state information and provide information about the determined one multiplexing type to the first UE through the first setting information. Alternatively, the first setting information may further include information about a sound wave waveform of the sound wave signals (in the case of the CDM type, information about a plurality of sound wave waveforms) and information about transmission timings of the sound wave signals.

Specifically, the first setting information may include information about the sound wave multiplexing type, which is one multiplexing type determined based on the noise information and the movement speed included in the state information, among the TDM type, FDM type, and CDM type. For example, when the first UE reports the state information including noise information including noise intensity equal to or greater than a first threshold value, the first UE may receive the first setting information including information about one multiplexing type among the TDM type and the CDM type. Alternatively, when the first UE reports the state information including information about a movement speed equal to or greater than a first threshold speed, the first UE may receive the first setting information including one multiplexing type among the FDM type and the CDM type. Alternatively, when the first UE reports the state information including noise information including noise intensity equal to or greater than the first threshold value and a movement speed equal to or greater than the first threshold speed, the first UE may receive the first setting information including information about the multiplexing type of the CDM type. That is, the first UE may receive the first setting information including information about a multiplexing type which is suitable for a channel state thereof and is robust from the at least one RSU by reporting the state information including information about the noise intensity and the movement speed.

Next, the first UE may receive sound wave signals from the two or more devices based on the first setting information (S207). As described above, the first UE may receive sound wave signals multiplexed according to the sound wave multiplexing type included in the first setting information.

Next, the first UE may calculate a TDoA based on the sound wave signals and measure the position of the first UE based on the calculated TDoA (S209). For example, the first UE may calculate the TDoA between the sound wave signals and measure an (absolute) position of the first UE based on the calculated TDoA and position information about the two or more devices included in the second configuration. Alternatively, the first UE may measure a first position based on a GNSS and correct the first position based on the measured position thereof. For example, even if the first UE fail to accurately measure the first position due to a surrounding environment, the first UE may more accurately measure the position thereof by correcting the first position using a position measured based on the sound wave signals.

Figure 24:
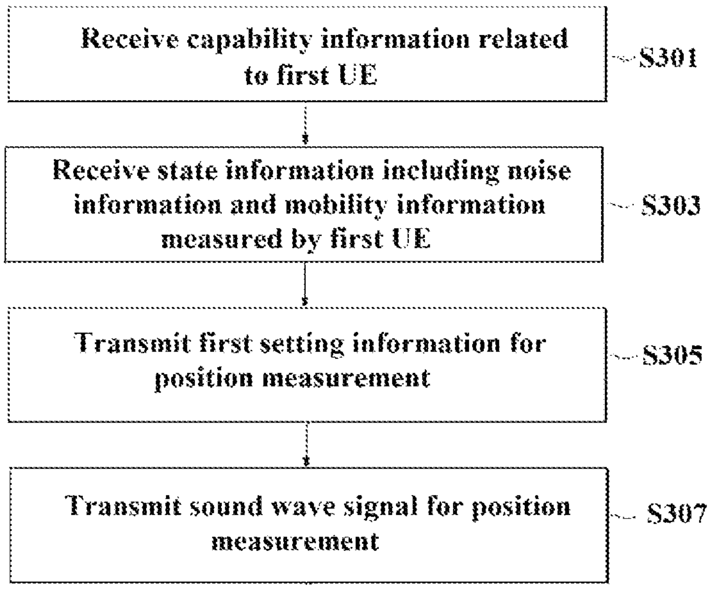
FIG. 24 is a diagram for explaining a method of supporting sound wave signal-based position measurement of a first UE by a first device.

FIG. 24 is a diagram for explaining a method of supporting sound wave signal-based position measurement of a first UE by a first device.

The first UE may correspond to the Rx UE or Rx device described above, and the first device may be at least one device or a reference device among the two or more devices described with reference to FIG. 23.

Referring to FIG. 24, a first device may receive capability information related to a first UE (S301). The capability information may include information about performance of a MIC of the first UE and/or performance of a processor of the first UE. Alternatively, the first UE may report the capability information after the first UE subscribes to a first server (or SoftV2X server) in relation to a position measurement service based on sound wave signals. In this case, the first UE may transmit second setting information, which includes service zones related to the position measurement service and/or position information about two or more devices related to the position measurement service, to the first UE. Alternatively, the SoftV2X server may receive the capability information and transmit the second setting information to the first UE.

The first device may receive state information from the first UE (S303). The state information may include noise information measured based on the MIC and mobility information. The noise information may include information about the intensity of noise received in an initial frequency band set based on the second setting information. The mobility information may include information about a movement speed and/or a movement direction of the first UE. Alternatively, the noise information may include information about a frequency at which noise intensity equal to or greater than a first threshold value is measured in the initial frequency band.

The first device may transmit first setting information determined based on the state information to the first UE (S305). Specifically, the first device may determine a frequency band for transmitting a sound wave signal based on the noise information and select a multiplexing type for the first UE among a plurality of multiplexing types based on the state information (or noise information and movement speed included in the state information). As described above, the plurality of multiplexing types may include a TDM type, an FDM type, and a CDM type.

For example, upon receiving the state information including noise information having noise intensity equal to or greater than a first threshold value, the first device may determine the TDM type among the plurality of multiplexing types as a multiplexing type for the first UE or determine the CDM type as the multiplexing type for the first UE. In other words, the first device does not determine the FDM type as the multiplexing type for the first UE that has reported the state information including noise information having noise intensity equal to or greater than the first threshold value. Alternatively, upon receiving the state information including information about a movement speed equal to or greater than a first threshold speed, the first device may determine the FDM type among the plurality of multiplexing types as the multiplexing type for the first UE or determine the CDM type as the multiplexing type for the first UE. In other words, the first device does not determine the TDM type as the multiplexing type for the first UE that has reported the state information including information about the movement speed equal to or greater than the first threshold speed. Alternatively, when the state information includes noise information having a noise intensity equal to or greater than the first threshold value and a movement speed equal to or greater than the first threshold speed, the first device may determine the CDM type as the multiplexing type for the first UE. The first device may transmit, to the first UE, the first setting information including information about the determined multiplexing type for the first UE, the sound wave waveform, and the timing of the sound wave.

Next, the first device may transmit a sound wave signal for measuring the position of the first UE to the first UE based on the first setting information (S307). In this case, devices other than the first device may also transmit sound wave signals corresponding to the first setting information as described above.

In this way, the first device may determine the multiplexing type of sound waves suitable for a surrounding sound wave environment of the first UE based on the state information reported by the first UE and transmit a sound wave signal based on the determined multiplexing type. Therefore, the first UE may support quick and accurate sound wave-based position measurement.

Communication System Example to which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 25:
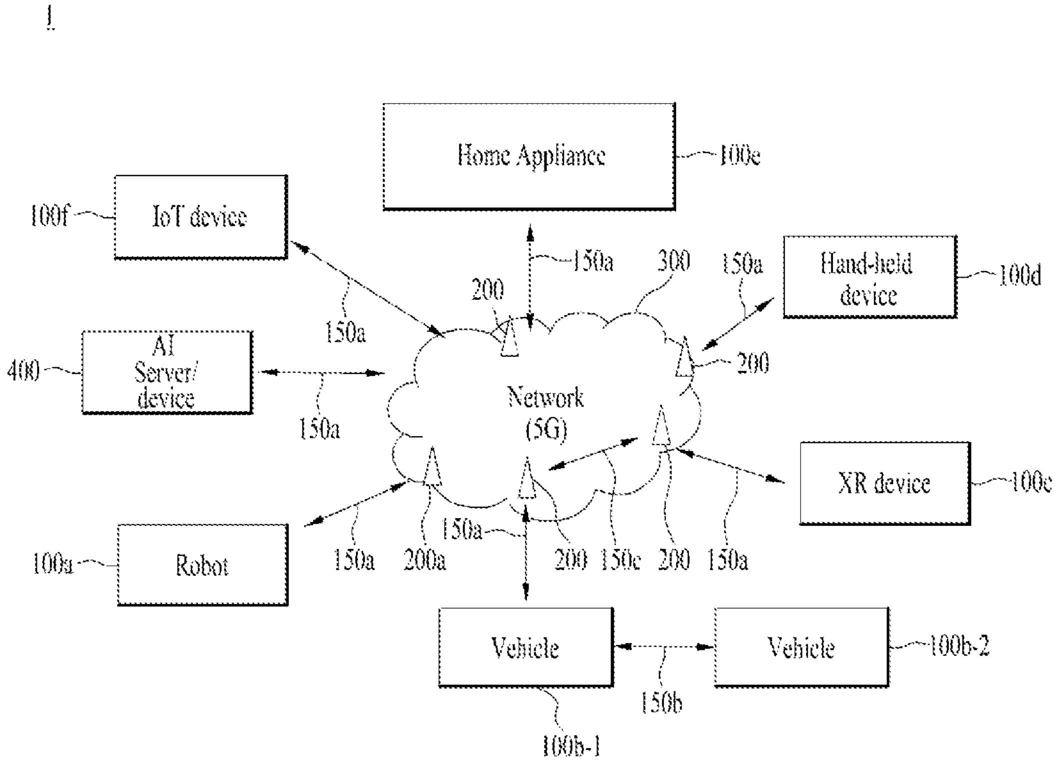
FIG. 25 illustrates a communication system applied to the present disclosure.

FIG. 25 illustrates a communication system applied to the present disclosure.

Referring to FIG. 25, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an extended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 26:
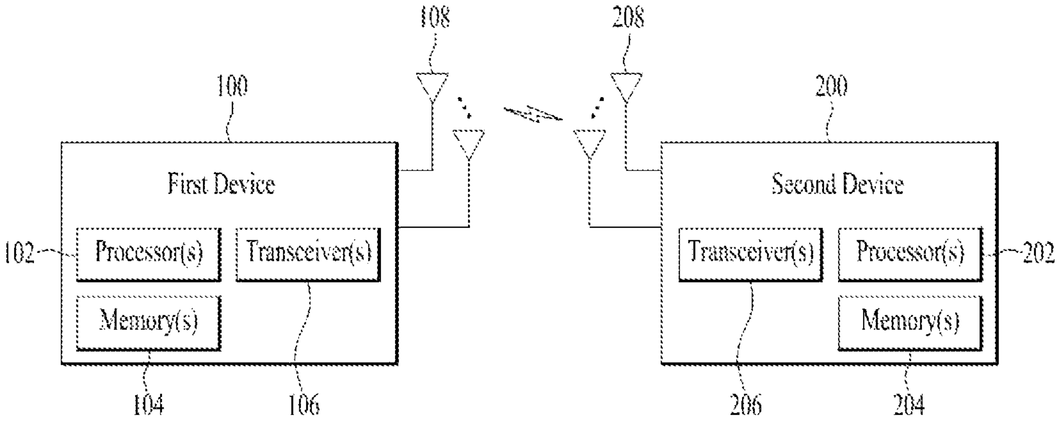
FIG. 26 illustrates wireless devices applicable to the present disclosure.

FIG. 26 illustrates a wireless device applicable to the present disclosure.

Referring to FIG. 26, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 25.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

According to an example, the first wireless device 100 or a first UE may include the processor 102 and the memory 104 connected to the transceiver 106 or an RF transceiver. The memory 104 may include at least one program capable of performing operations related to the embodiments described with reference to FIGS. 11 to 23.

Specifically, the processor 102 may control the RF transceiver to report capability information related to the first UE, report state information related to the first UE, receive first setting information related to position measurement, and receive sound wave signals from two or more devices based on the first setting information, calculates a time difference of arrival between the sound wave signals, and measures a position of the first UE based on the time difference of arrival. The capability information may include information about performance of a microphone included in the first UE. The first setting information may include information about a frequency band of the sound wave signals and a sound wave multiplexing type, determined based on at least one of the capability information or the state information.

Alternatively, a chipset including the processor 102 and the memory 104 may be configured. The chipset may include at least one processor, and at least one memory operably connected to the at least one processor and, and storing instructions that, when executed, cause the at least one processor to perform operations. The operations may include reporting capability information related to the first UE, reporting state information related to the first UE, receiving first setting information related to position measurement, receiving sound wave signals from two or more devices based on the first setting information, calculating a time difference of arrival between the sound wave signals, and measuring a position of the first UE based on the time difference of arrival. The capability information may include information about performance of a microphone included in the first UE. The first setting information may include information about a frequency band of the sound wave signals and a sound wave multiplexing type, determined based on at least one of the capability information or the state information. The at least one processor may perform operations related to the embodiments described with reference to FIGS. 11 to 23 based on a program included in the memory.

Alternatively, a computer-readable storage medium storing at least one computer program that causes the at least one processor to perform operations is provided. The operations include reporting capability information related to the first UE, reporting state information related to the first UE, receiving first setting information related to position measurement, receiving sound wave signals from two or more devices based on the first setting information, calculating a time difference of arrival between the sound wave signals, and measuring a position of the first UE based on the time difference of arrival. The capability information may include information about performance of a microphone included in the first UE. The first setting information may include information about a frequency band of the sound wave signals and a sound wave multiplexing type, determined based on at least one of the capability information or the state information. The computer program may include programs capable of performing operations related to the embodiments described with reference to FIGS. 11 to 23.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

According to an example, the second wireless device 200 or a first device may include the processor 202 and the memory 204 connected to the transceiver 206 or an RF transceiver. The memory 204 may include at least one program capable of performing operations related to the embodiments described with reference to FIGS. 11 to 23.

Specifically, according to an embodiment, the processor 202 controls the RF transceiver to receive capability information related to a first UE, receive state information from the first UE, transmit first setting information related to the position measurement to the first UE, and transmit a sound wave signal based on the first setting information. The capability information may include information about performance of a microphone included in the first UE. The setting information may include information about a frequency band of the sound wave signal and a sound wave multiplexing type, determined based on at least one of the capability information or the state information.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 27:
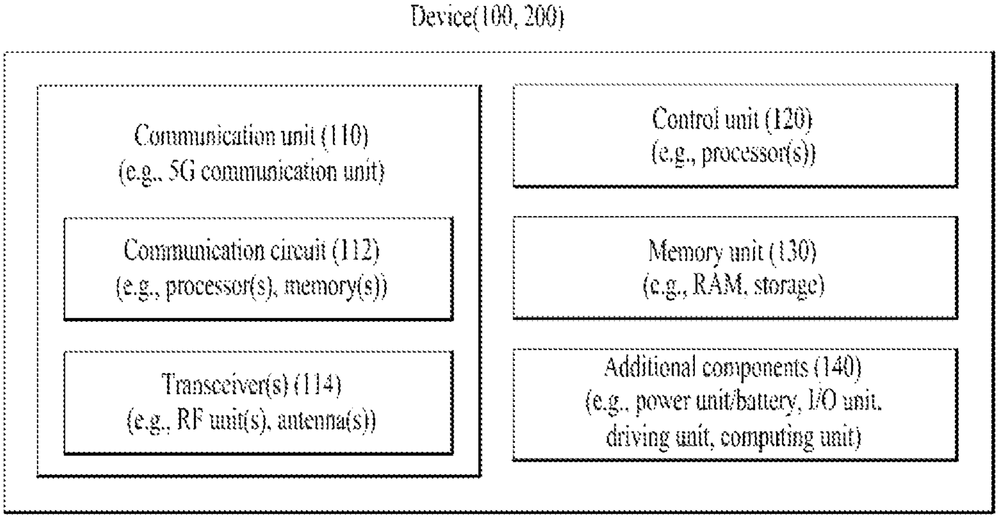
FIG. 27 illustrates another example of a wireless device to which the present disclosure is applied.

FIG. 27 illustrates another example of a wireless device applied to the present disclosure. The wireless device may be implemented in various forms according to a use-case/service (refer to FIG. 25)

Referring to FIG. 27, wireless devices 100 and 200 may correspond to the wireless devices 100 and 200 of FIG. 26 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 26. For example, the transceiver(s) 114 may include the one or more transceivers 106 and 206 and/or the one or more antennas 108 and 208 of FIG. 26. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 25), the vehicles (100*b*-1 and 100*b*-2 of FIG. 25), the XR device (100*c* of FIG. 25), the hand-held device (100*d* of FIG. 25), the home appliance (100*e* of FIG. 25), the IoT device (100*f* of FIG. 25), a digital broadcast terminal, a hologram device, a public safety device, an MTC device, a medicine device, a fintech device (or a finance device), a security device, a climate/environment device, the AI server/device (400 of FIG. 25), the BSs (200 of FIG. 25), a network node, etc. The wireless device may be used in a mobile or fixed place according to a use-example/service.

In FIG. 27, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN) technology and may be implemented in standards such as LTE Cat NB1 and/or LTE Cat NB2, and is not limited to the above-described names. Additionally or alternatively, the wireless communication technology implemented in the wireless devices (XXX, YYY) of the present specification may perform communication based on LTE-M technology. In this case, as an example, the LTE-M technology may be an example of LPWAN technology and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present specification is at least one of ZigBee, Bluetooth, and Low Power Wide Area Network (LPWAN) considering low power communication and is not limited to the above-described names. As an example, ZigBee technology can generate personal area networks (PANs) related to small/low-power digital communication based on various standards such as IEEE 802.15.4 and may be called various names.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network including a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The above-described embodiments of the present disclosure are applicable to various mobile communication systems.

The invention claimed is:

1. A method by a first user equipment (UE) comprising:

reporting capability information related to the first UE;

reporting state information related to the first UE;

receiving first setting information related to position measurement;

receiving sound wave signals from two or more devices based on the first setting information;

calculating a time difference of arrival between the sound wave signals; and measuring a position of the first UE based on the time difference of arrival, wherein the capability information includes information about performance of a microphone included in the first UE, wherein the state information includes a movement speed of the first UE and a noise intensity, wherein the first setting information includes information about a frequency band of the sound wave signals determined based on the capability information and a sound wave multiplexing type, determined from among a frequency-division multiplexing (FDM) type, a time-division multiplexing (TDM) type, and a code-division multiplexing (CDM) type based on the state information, and wherein, based on (i) the noise intensity equal to or greater than a first threshold value and (ii) the movement speed of the first UE equal to or greater than a first threshold speed, the sound wave multiplexing type is determined to be the CDM type.

2. The method of claim 1, wherein the capability information further includes information about performance of a processor of the first UE.

3. The method of claim 1, further comprising receiving second setting information including information about service zones related to position measurement based on the sound wave signals and including position information of the two or more devices in each service zone, wherein the state information is reported based on the first UE entering one of the service zones.

4. A method by a first device comprising:

receiving capability information related to a first user equipment (UE);

receiving state information from the first UE;

transmitting first setting information related to position measurement to the first UE; and transmitting a sound wave signal based on the first setting information, wherein the capability information includes information about performance of a microphone included in the first UE, wherein the state information includes a movement speed of the first UE and a noise intensity, wherein the setting information includes information about a frequency band of the sound wave signal determined based on the capability information, and a sound wave multiplexing type, determined from among a frequency-division multiplexing (FDM) type, a time-division multiplexing (TDM) type, and a code-division multiplexing (CDM) type based on the state information, and wherein, based on (i) the noise intensity equal to or greater than a first threshold value and (ii) the movement speed of the first UE equal to or greater than a first threshold speed, the sound wave multiplexing type is determined to be the CDM type.

5. A first user equipment (UE) comprising:

a radio frequency (RF) transceiver; and a processor connected to the RF transceiver, wherein the processor controls the RF transceiver to report capability information related to the first UE, report state information related to the first UE, receive first setting information related to position measurement, and receive sound wave signals from two or more devices based on the first setting information, calculates a time difference of arrival between the sound wave signals, and measures a position of the first UE based on the time difference of arrival, wherein the capability information includes information about performance of a microphone included in the first UE, wherein the state information includes a movement speed of the first UE and a noise intensity, wherein the first setting information includes information about a frequency band of the sound wave signals determined based on the capability information, and a sound wave multiplexing type, determined from among a frequency-division multiplexing (FDM) type, a time-division multiplexing (TDM) type, and a code-division multiplexing (CDM) type based on the state information, and wherein, based on (i) the noise intensity equal to or greater than a first threshold value and (ii) the movement speed of the first UE equal to or greater than a first threshold speed, the sound wave multiplexing type is determined to be the CDM type.

* * * * *